(12) United States Patent
Salour et al.

(10) Patent No.: US 10,999,429 B1
(45) Date of Patent: *May 4, 2021

(54) REGION-BASED BRIDGING OF CALLS USING CLIENT-SPECIFIC CONTROL AND REVISED CALLER IDENTIFIERS

(71) Applicant: 8×8, Inc., San Jose, CA (US)

(72) Inventors: Mehdi Salour, San Jose, CA (US); Zhishen Liu, San Jose, CA (US); Oisin Glynn, San Jose, CA (US); Ona Stewart, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,860

(22) Filed: Oct. 30, 2018

Related U.S. Application Data

(63) Continuation of application No. 15/377,797, filed on Dec. 13, 2016, now Pat. No. 10,122,682, which is a (Continued)

(51) Int. Cl.
*H04M 3/42* (2006.01)
*H04L 29/06* (2006.01)
(Continued)

(52) U.S. Cl.
CPC ...... *H04M 3/42042* (2013.01); *H04L 65/102* (2013.01); *H04L 67/18* (2013.01);
(Continued)

(58) Field of Classification Search
CPC .. H04M 3/42042; H04M 3/54; H04M 7/0075; H04M 2242/04; H04M 2242/14; H04L 67/18
See application file for complete search history.

(56) References Cited

U.S. PATENT DOCUMENTS 6,456,625 B1    9/2002   Itoi
6,498,791 B2 * 12/2002   Pickett ................ H04L 12/2856
                                                                  370/353
(Continued)

FOREIGN PATENT DOCUMENTS

WO       WO0135579       5/2001

OTHER PUBLICATIONS

"Cisco Hosted Unified Communications Services", Cisco Product Data Sheet, Jun. 18, 2007 (retreived May 31, 2016) http://www.cisco.com/c/en/us/products/collateral/unified-communications/product_data_sheet0900aecd80670040.html.

*Primary Examiner* — Steven H Nguyen
(74) *Attorney, Agent, or Firm* — Crawford Maunu PLLC

(57) ABSTRACT

Apparatus and methods are disclosed for client-based control of revising caller identifications (IDs) for communications between a private network and a public network. An apparatus including a telecommunications-providing server and processing circuit that communicates client-specific sets of data over an interface protocol. The telecommunications-providing server revises a caller ID for a VoIP call based on the client-specific sets of data, an identifier that corresponds to a requesting endpoint, and a geographic region determined from the call request. Further, the telecommunications-providing server causes control data to be sent to activate an analog-telephone bridging circuit and redirect the VoIP call by obtaining a dial tone and passes at least a subset of the data packet through the analog-telephone bridging circuit for connecting over the local line. The subset of the data packet includes the revised caller ID which is a local number identified by the determined geographic region.

20 Claims, 8 Drawing Sheets

Related U.S. Application Data continuation-in-part of application No. 15/337,545, filed on Oct. 28, 2016, now Pat. No. 10,027,624, and a continuation-in-part of application No. 15/240,391, filed on Aug. 18, 2016, now Pat. No. 10,404,759, and a continuation-in-part of application No. 15/240,457, filed on Aug. 18, 2016, now Pat. No. 10,135,974.

(60) Provisional application No. 62/353,971, filed on Jun. 23, 2016, provisional application No. 62/353,977, filed on Jun. 23, 2016.

(51) Int. Cl.
| | | |
|---|---|---|
| *H04M 3/54* | (2006.01) | |
| *H04M 7/00* | (2006.01) | |
| *H04L 29/08* | (2006.01) | |

(52) U.S. Cl.
CPC ........... *H04M 3/54* (2013.01); *H04M 7/0075* (2013.01); *H04M 2242/04* (2013.01); *H04M 2242/14* (2013.01)

(56) References Cited

U.S. PATENT DOCUMENTS

| | | | | |
|---|---|---|---|---|
| 6,744,858 B1 * | 6/2004 | Ryan | .................... | H04M 3/5191 |
| | | | | 379/265.09 |
| 6,826,174 B1 * | 11/2004 | Erekson | .............. | H04M 1/2535 |
| | | | | 370/352 |
| 7,280,530 B2 * | 10/2007 | Chang | ................. | H04M 7/0057 |
| | | | | 370/352 |
| 7,403,604 B2 | 7/2008 | Mundra et al. | | |
| 8,064,909 B2 | 11/2011 | Spinelli et al. | | |
| 8,275,110 B2 * | 9/2012 | Vendrow | ........... | H04M 3/42059 |
| | | | | 379/211.02 |
| 8,656,417 B2 | 2/2014 | May | | |
| 8,798,035 B1 * | 8/2014 | Passe | ...................... | H04L 12/66 |
| | | | | 370/352 |
| 8,918,867 B1 | 12/2014 | Salour | | |
| 8,948,358 B1 | 2/2015 | Rengarajan et al. | | |
| 8,964,726 B2 | 2/2015 | Lawson et al. | | |
| 9,065,917 B1 | 6/2015 | Taliancich et al. | | |
| 9,137,127 B2 | 9/2015 | Nowack et al. | | |
| 9,160,696 B2 | 10/2015 | Wilsher et al. | | |
| 9,240,966 B2 | 1/2016 | Wilsher et al. | | |
| 9,270,833 B2 | 2/2016 | Ballai et al. | | |
| 9,294,433 B1 | 3/2016 | Salour | | |
| 9,294,515 B2 | 3/2016 | Sayko | | |
| 9,306,982 B2 | 4/2016 | Lawson et al. | | |
| 9,338,064 B2 | 5/2016 | Stratton et al. | | |
| 9,344,573 B2 | 5/2016 | Wolthuis et al. | | |
| 9,407,597 B2 | 8/2016 | Lawson et al. | | |
| 9,426,116 B1 | 8/2016 | Salour | | |
| 9,455,949 B2 | 9/2016 | Lawson et al. | | |
| 9,456,008 B2 | 9/2016 | Lawson et al. | | |
| 9,459,925 B2 | 10/2016 | Lawson et al. | | |
| 9,459,926 B2 | 10/2016 | Shakirzyanov et al. | | |
| 9,621,735 B2 * | 4/2017 | Ting | ................. | H04M 15/8044 |
| 10,027,624 B1 * | 7/2018 | Salour | ................ | H04L 61/2567 |
| 10,057,412 B1 * | 8/2018 | Salour | ................ | H04M 7/0075 |
| 10,122,682 B1 * | 11/2018 | Salour | ................ | H04L 61/2514 |
| 10,523,813 B1 * | 12/2019 | Salour | .................... | H04L 65/104 |
| 2004/0218748 A1 | 11/2004 | Fisher | | |
| 2005/0007999 A1 | 1/2005 | Becker et al. | | |
| 2006/0035647 A1 * | 2/2006 | Eisner | ................. | H04W 64/00 |
| | | | | 455/456.1 |
| 2007/0047571 A1 | 3/2007 | Kandikonda et al. | | |
| 2007/0091800 A1 | 4/2007 | Corcoran | | |
| 2007/0115942 A1 | 5/2007 | Money et al. | | |
| 2007/0116237 A1 * | 5/2007 | Katkam | .............. | H04L 65/4007 |
| | | | | 379/265.01 |
| 2008/0037715 A1 * | 2/2008 | Prozeniuk | .............. | H04M 11/04 |
| | | | | 379/45 |
| 2008/0063153 A1 * | 3/2008 | Krivorot | ............... | H04M 7/006 |
| | | | | 379/45 |
| 2008/0125077 A1 | 5/2008 | Velazquez et al. | | |
| 2009/0003535 A1 * | 1/2009 | Grabelsky | ........... | H04Q 3/0025 |
| | | | | 379/45 |
| 2009/0086947 A1 | 4/2009 | Vendrow | | |
| 2009/0168755 A1 * | 7/2009 | Peng | ................... | H04L 65/1069 |
| | | | | 370/352 |
| 2009/0201916 A1 | 8/2009 | Caron et al. | | |
| 2010/0128709 A1 | 5/2010 | Liu et al. | | |
| 2010/0142516 A1 | 6/2010 | Lawson et al. | | |
| 2010/0226362 A1 * | 9/2010 | Kim | ........................ | H04L 12/14 |
| | | | | 370/352 |
| 2010/0232594 A1 | 9/2010 | Lawson et al. | | |
| 2010/0246439 A1 * | 9/2010 | Heath | ..................... | H04L 67/18 |
| | | | | 370/254 |
| 2011/0122865 A1 | 5/2011 | Androski et al. | | |
| 2011/0170681 A1 | 7/2011 | Kole et al. | | |
| 2011/0320550 A1 | 12/2011 | Lawson et al. | | |
| 2012/0027011 A1 * | 2/2012 | Chu | ...................... | H04M 7/0075 |
| | | | | 370/352 |
| 2012/0208495 A1 | 8/2012 | Lawson et al. | | |
| 2012/0304245 A1 | 11/2012 | Lawson et al. | | |
| 2013/0072153 A1 | 3/2013 | Lawson et al. | | |
| 2013/0107752 A1 | 5/2013 | Kadakia et al. | | |
| 2013/0212603 A1 | 8/2013 | Cooke et al. | | |
| 2013/0304929 A1 | 11/2013 | Fahlgren et al. | | |
| 2014/0044123 A1 | 2/2014 | Lawson et al. | | |
| 2014/0105372 A1 | 4/2014 | Nowack et al. | | |
| 2014/0286197 A1 | 9/2014 | Zhu et al. | | |
| 2016/0150089 A1 * | 5/2016 | Garg | ........................ | H04L 67/02 |
| | | | | 370/352 |
| 2017/0070540 A1 | 3/2017 | Combellas et al. | | |

* cited by examiner

REGION-BASED BRIDGING OF CALLS USING CLIENT-SPECIFIC CONTROL AND REVISED CALLER IDENTIFIERS

OVERVIEW

The instant disclosure relates generally to communication systems and, more particularly to communication between endpoint devices wide-area-networks (WANs), such as the internet and local area networks (LANs). For ease of reference, endpoint devices are sometimes referred to simply as an "endpoint" and where they are configured with VoIP capability, they are sometimes referred to as a "VoIP endpoint." Each such endpoint or endpoint device refers to or includes communications circuitry with programming/configuration data specific to the communications protocol(s) for which the endpoint is enabled. In many contexts, endpoints and VoIP endpoints (which are VoIP-capable) are telephones commonly used and referred to as IP phones such as used on desktops, mobile (smart) phones, desktop CPU stations, laptops, tablets and the like. For ease of reference, a WAN may be referred to as a public network and a LAN may be referred to as a private network. IP addresses used for identification of endpoints in the public network may be referred to as public IP addresses and IP addresses used for identification of endpoints in the private network may be referred to as private IP addresses. Public IP addresses are issued by a central authority known as the Internet Assigned Number Authority ("IANA").

Due to the limited number of the currently used IPv4 type IP addresses, in many communications environments there are insufficient public IP addresses to identify all endpoints uniquely in a private network. This issue is addressed in part by network address translation ("NAT") as currently used in many networks to allow multiple endpoints in a private network to be identified on a public network using the same public IP address. In this regard, the multiple endpoints of the private network communicate data via a single public IP address. For each connection initiated by an endpoint, a NAT pathway is created and maintained by a NAT circuit for a limited period of time. The NAT pathway maps a private IP address and port of the device to an exclusive port of the public IP address. By mapping devices to different virtual ports of the public IP address, multiple endpoints may be uniquely identified by the port: IP address combination— thereby allowing the endpoints in a private network to communicate on the public network using the same public IP address.

Certain portions of the instant disclosure more particularly relate to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

BRIEF SUMMARY OF THE INVENTION

Various example embodiments are directed to issues such as those addressed above and/or others which may become apparent from the following disclosure concerning communications systems involving, for example, VoIP-enabled endpoints and/or methods for providing remote telecommunication services for endpoints.

Certain exemplary aspects of the instant disclosure are directed to embodiments used in telecommunication systems which convert or translate addresses of endpoints for effective communications within a larger communications network or set of networks. Various embodiments are useful for communicating between endpoints in a private network and endpoints in a public network and that allow for entities to control the caller identifications (IDs) provided to the receiving endpoint. The revised caller IDs, in specific aspects, are revised to reflect a current physical location of the requesting endpoint or the geographic region of the called or receiving endpoint. Endpoints in the private network can have various caller IDs that are provided along with a VoIP call and that are associated with different geographic regions of the entity. For example, an insurance company can have offices throughout the United States, with endpoints distributed at each office. When an employee makes a call using the telecommunication service provider, the caller ID is provided to the receiving or called endpoint, such that the receiving endpoint may call the employee back. In some instances, the entity may revise the caller ID provided, so that the call appears to be from a local number and/or a different number as desired. For example, the entity can control revision of the caller ID based on a set of rules and/or different geographic regions.

Specific aspects are directed to an apparatus that is provided as part of a telecommunication network in which remote telecommunication services are provided. The apparatus includes a telecommunications-providing server, such as a server of the telecommunication service provider, and processing circuitry. The telecommunications-providing server can provide Voice over Internet Protocol (VoIP) communication service relationships with a plurality of disparate client entities by controlling communication between endpoints. Each of the plurality of disparate client entities can have associated endpoints. The processing circuitry and/or a processing circuit can belong to or be under the control of one of the client entities (e.g., each client entity has or is in control of a processing circuit). For example, a processing circuit can communicate with the telecommunications-providing server by generating client-specific sets of data. The client-specific sets of data can be used to remotely control routing within the telecommunication network by the respective client entity and without the telecommunication service provider manually revising the routing and/or without providing the client entity with information on the processing by the telecommunications-providing server. Specifically, the client-specific sets of data can be indicative of client-specific communications routing and/or client-specific communications data, and are conveyed over an interface protocol. Each of the telecommunications-providing servers and each of the plurality of disparate client entities communicate using an interface protocol to facilitate a variety of permissible types of communication.

In related specific aspects, the telecommunications-providing server can be used to communicate between endpoints of the private network and endpoints of a public network. For example, endpoints provide data packets to a port of the telecommunications-providing server to request VoIP calls. In response to a data packet received at a port of the telecommunications-providing server requesting the VoIP call, the telecommunications-providing server determines a geographic region that an endpoint identified using the data packet (e.g., the called or receiving endpoint) is located and whether a local line should be accessed. A local line may be accessed when the called endpoint is associated with a land line and/or the public network. In specific aspects, in response to an indication that the local line should be accessed, the telecommunications-providing server revises a caller ID for the VoIP call based on the client-specific sets of data, based on an identifier that corresponds to an endpoint requesting the VoIP call, and based on the determined geographic region. For example, a specific client entity may provide that all endpoints of a particular office or a subset of endpoints of a particular office have their numbers changed to a local number as indicated by the called number. In other embodiments, an endpoint is calling an emergency service and has traveled from their assigned geographic region. The caller ID can be revised to a local number identified by the determined geographic region, such as the location of the called endpoint and/or the location of the emergency service provider/where the user is actually located.

In some aspects, the telecommunications-providing server causes control data to be sent to activate an analog-telephone bridging (ATB) circuit and redirect the VoIP call by obtaining a dial tone and passing at least a subset of the data packet through the ATB circuit for connecting over a local line. The subset of data may include providing the emergency call number (e.g., 911) from a dialed number (e.g., 8_911) and/or a local number (650-123-1234 from 8_650-123-1234) and the revised caller ID. Alternatively and/or in addition, the control data causes accessing and passing of a provisioned VoIP number for connecting to the endpoint identified (e.g., the called endpoint). For example, the provisioned VoIP number can be among a plurality of VoIP numbers. The plurality of VoIP numbers are set aside for the different geographic regions and can be used for connecting through the ATB circuit to the local line or through the telecommunications-providing server for connecting to a number being called. As a specific example, some emergency service providers, such as in France, may be unable to use existing numbers and/or local lines. The provisioned VoIP number can be used to connect the user to the emergency service provider and may be registered with the emergency service provider (such that they recognize the number).

In a specific implementation, the telecommunications-providing server receives a data packet requesting a VoIP call at a first port of the telecommunications-providing server and responds to the data packet by determining a geographic region that an endpoint device identified using the data packet is located and whether a local line should be accessed. The telecommunications-providing server responds to the data packet indicating that a local line should be accessed by revising a caller ID for the VoIP call based on the client-specific sets of data, based on an identifier that corresponds to the endpoint requesting the VoIP call, and based on the determined geographic region, and causes control data to be sent. The control data activates an analog-telephone bridging circuit and redirects the VoIP call by obtaining a dial tone and passing at least a subset of the data packet through the analog-telephone bridging circuit for connecting over the local line. The subset of the data packet includes the revised caller ID that is a local number identified by the determined geographic region. The telecommunications-providing server further responds to another data packet received at the first port requesting an additional VoIP call by determining a geographic region that an additional endpoint identified using the data packet is located and whether a local line should be accessed. The data packet can indicate that a local line should not (or cannot be) accessed for the call. In response, the telecommunications-providing server revises a caller ID for the additional VoIP call based on the client-specific sets of data, based on an identifier that corresponds to the additional endpoint requesting the additional VoIP call, and based on the determined geographic region, and connects the additional VoIP call by accessing and passing a provisioned VoIP number (e.g., to connect the additional VoIP call between the identified endpoint and a called endpoint). The provisioned VoIP includes the revised caller ID which is a local number identified by the determined geographic region that the additional endpoint is located.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
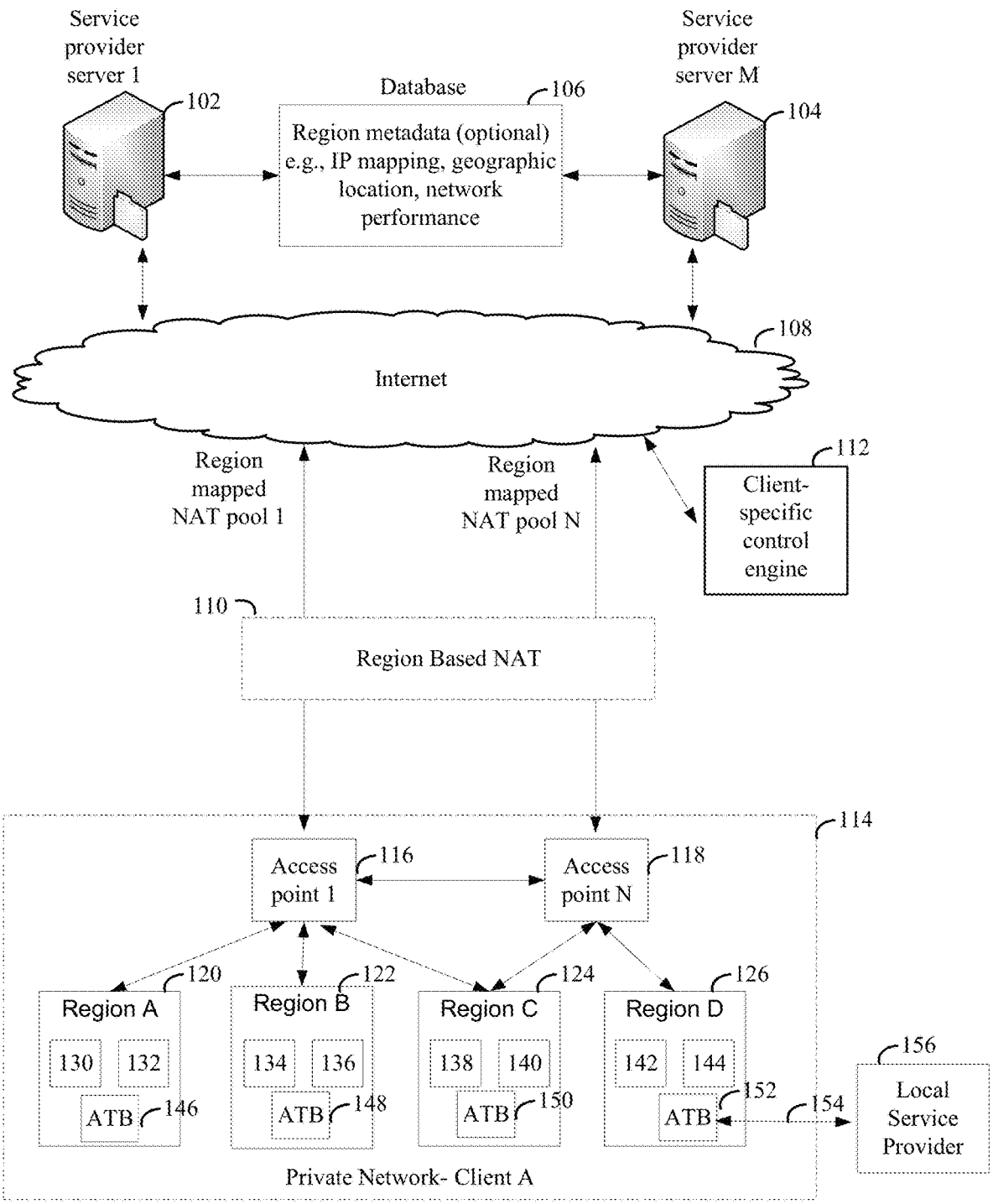
FIGS. 1A-1B show examples of a communication network, configured in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, including systems and/or devices, and methods involving redirection and bridging of calls between a private network and a public network using revised caller identification (IDs). In various implementations, the caller IDs are revised to reflect a current physical location of the requesting endpoint or the geographic region of the called or receiving endpoint. Some example implementations are directed to providing remote communication services for endpoints associated with a plurality of different client accounts and allowing for client-specific control of the revised caller IDs. Some example implementations are directed to apparatuses and methods for performing IP-address mapping (such as NAT) for data communicated between a public network and a private network having endpoints located in a plurality of defined geographic regions using an analog-telephone bridging (ATB) circuit connected to one or more local (or fixed) lines. In certain embodiments, aspects of the present disclosure have been shown to be beneficial when used in the context of location-based routing of data in networks. While not necessarily so limited, various aspects may be appreciated through the following discussion of non-limiting examples which use exemplary contexts.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element, and various embodiments are described without any specific reference to the illustrations disclosed herein. Also, although aspects and features may in some cases be described in individual figures, it will be appreciated that features from one figure (or characterized embodiment(s)) can be combined with features of another figure or embodiment even though the combination is not explicitly shown or explicitly described as a combination.

Remote service providers can provide communication services for a plurality of different customers and across both private and public networks. Customers may be given client-specific control allowing for customization of the servicers. This might include customizable auto attendants, call routing, call forwarding, revising caller IDs, voicemail, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided for the users of a client account during operation, while maintaining the integrity and security of the underlying system for providing the remote services. In a specific embodiment, and as an illustrative example, a VoIP communication system may be configured to allow a client-specific control engine to dynamically modify and control the call flow and processing at all levels within the system, via the interface, including (re)routing of incoming calls to an ATB circuit and selective identification of when to revise caller IDs.

In specific embodiments, the client-specific control can allow for an entity to revise caller IDs presented for a VoIP call when communicating. Endpoints in the private network can have extensions (e.g., phone numbers) that are distributed and/or associated with different geographic regions. Respective endpoints have an assigned extension that is used as a caller ID when placing VoIP calls and that includes a local number of the respective geographic regions. For example, a first endpoint is associated with Florida and has a caller ID of a local phone number in Florida. One or more of the endpoints can be mobile, such as a mobile phone and/or computing device. When the endpoint is located in a different location than the respective geographic region it is assigned to, VoIP calls from the endpoint use the same respective caller ID (e.g., local phone number for Florida) such that the VoIP call appears from the same telephone number regardless of where the user is located. In some instances, the client entity may customize revision of the caller IDs to reflect the current location of the endpoint and/or to reflect a geographic location of the telephone number being called. For example, a user may be calling an emergency service where providing current location information of the user may be beneficial. In other specific examples, a sales person may be making sales calls and having the VoIP calls appear as a local call may increase the likelihood of the call being answered.

In certain specific embodiments, a communication system includes a telecommunications-providing server(s) configured to provide VoIP communications for endpoints of a plurality of client accounts. The endpoints may include VoIP-enabled devices (e.g., IP phones, smart phones, tablets, and/or desktop computers with appropriate VoIP software applications) and/or non-VoIP endpoints (e.g., plain old telephone service (POTS) telephones and cellular-capable devices). Each endpoint is respectively associated with an account of a respective client entity. Endpoints may be associated with a particular client account by registering the endpoint with a particular client account serviced by the telecommunications-providing server(s). Registered devices for each client account may be specified in a respective account settings file accessible by the telecommunications-providing server(s). The endpoints in the private network and endpoints in the public network are respectively associated with different sets of IP addresses. For example, the endpoints in the private network have a first set of respective IP addresses and the endpoints in the public network have a second set of IP addresses.

In different embodiments, the telecommunications-providing server(s) may provide VoIP communications using various processes and circuits. As one example, the telecommunications-providing server(s) may provide VoIP communications by 1) routing and establishing VoIP calls for the endpoint of each of the plurality of disparate client entities according to and responsive to client-specific sets of control data, and 2) generating call event data for the routed VoIP calls. A particular example of a telecommunications-providing server may use session initiation protocol (SIP) to handle various call functions (e.g., call setup and tear down). However, the various embodiments discussed herein are not necessarily limited thereto. Consistent with the above and in other embodiments disclosed herein, the telecommunications-providing servers can be configured to establish a leg of the call from the VoIP endpoints (or dial peers) to another VoIP endpoint or to a gateway. For example, the telecommunications-providing server can activate an ATB to communicate between an endpoint in the private network and an endpoint in the public network. An ATB circuit is an analog gateway configured to provide a private network with connectivity to the public network. The ATB circuit can connect to one or more local lines to allow for communication between the public network and the private network. The ATB circuit utilizes the one or more local lines connected to it and redirects a call to the public network, such as an emergency service provider and/or endpoints that are not part of the private network (e.g., local or toll free telephone numbers).

The VoIP system can be used to direct telecommunication calls via data packets received by a telecommunications-providing server from an endpoint within the private network to another endpoint within the public network or private network. The telecommunications-providing server can be part of a VoIP PRI Gateway that uses a variable extension protocol to enable direct routing of calls between endpoints via the private and the public networks. In response to a data packet received at a first port of a telecommunications-providing server that has a first IP address of the first set of IP addresses (e.g., identifies an endpoint in the private network), the data packet is used to determine a geographic region where the endpoint is located, which is identified by the first IP address. Further, the data packet is used to determine whether a local line should be accessed for the requested call.

The data packet received at the first port can include data identifying the other endpoint that the endpoint is attempting to call. For example, the data packet can include an extension that identifies the other endpoint or corresponds to information for connecting over the local line through the ATB circuit. The telecommunications-providing server uses a variable extension protocol to interpret whether the data packet received at the first port either corresponds to an extension identifying another endpoint in the private network or in the public network. Alternatively and/or in addition, the variable extension protocol can be used to interpret and identify which of a plurality of different extensions in a branch office (e.g., a geographic region) is targeted by the data packet at the first port.

In response to the endpoint (identified by a first IP address) indicating that the local line should be accessed, the ATB circuit is activated by providing control data to the ATB circuit. The indication that the local line should be accessed can include the call number for the VoIP call including an emergency provider number (e.g., 911) and/or a digit indicating a local telephone number or toll free-number (e.g., an "8" before the telephone number of seven digits, ten digits, eleven digits, or the emergency provider number). In specific embodiments, the ATB circuit can redirect and connect to an emergency service provider which is specific to the geographic region and assigned for emergency calls of a certain type and that are initiated on behalf of the private network.

In various embodiments, the communication system includes one or more processing circuits configured to implement client-specific control engines configured to dynamically adjust the VoIP communications provided for a respective client account via an interface. For example, the client-specific control engines may generate client-specific control data by processing a respective set of control directives for the client account. The control directives may be customized by each client entity to customize dynamic adjustments of VoIP services to be performed for VoIP calls of endpoints of the client account. As described above and below in further detail, the control directions can be used to control revised caller ID provided for particular calls. For example, a particular entity can establish a set of rules for controlling revised caller IDs across all geographic regions and/or specific to geographic regions and/or particular endpoints.

In certain embodiments, the client-specific control engines provide client-specific control data to the telecommunications-providing server(s) via an interface protocol that characterizes the format in which the client-specific sets of data are communicated to the telecommunications-providing server(s). According to various embodiments, data is communicated via the interface protocol using high-level programming language instruction set. The high-level programming language instruction set allows a programmer access to the telecommunications-providing server(s) (or PaaS computing server(s) providing remote services) by way of a controlled and limited set of call control operations and functions. The limitations on the operations can be particularly useful for allowing programming control to be placed into the hands of different customers of the provider of the VoIP servers. For example, the provider can update or make other changes to how the telecommunications-providing server(s) are configured without requiring modification to documents written to use the high-level language, which might otherwise be required to account for the changes. Moreover, the telecommunications-providing server(s) and their data can be protected from poor programming decisions (intentional or otherwise) by tightly controlling the extent that the documents provide control or access the inner workings of the telecommunications-providing server(s). Each of the telecommunications-providing servers and each of the plurality of disparate client entities communicate using the interface protocol to facilitate permissible types of communication Consistent with the above-characterized embodiments, at the client side of the VoIP communications services, the client's computer-based processing (e.g., by the client-specific control engine) generates and submits control (routing/data-communication) directives for assessment and use by the VoIP communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the VoIP communications service provider, which receives the directives (submitted from the client side) for adjusting the VoIP communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). Entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.)

For many less-complex applications/client needs, a hardware accelerated decision making circuit (e.g., logic circuitry implemented in hosted FPGA fabric) can be tailored specifically for the types of data information and call-routing decisions needed by the submitting client in real time and dynamically as the VoIP communications service provider authenticates the client and its submitted control directives. For example, a client may have an increasing number of branches or franchise offices, each with only 1-2 videophones/smart-terminals requiring minimal video/audio services. For each such office, the client-specific engine (in the form of a hardware accelerated decision making circuit) is configured and arranged to execute functionality, which is specific to obtaining and assigning phone numbers (as part of the client's PBX packaged telephony services). The submitted control directives result in the VoIP communications service provider modifying the actual services provided to the client, in dynamic fashion and in a manner consistent with the client's ongoing needs. The communications, which can include land-line and/or requests for PBX numbers, to the VoIP communications service provider are verified in each instance for client identification and the client-based subscription status for the relevant services.

By using a common interface protocol (e.g., the programming language, codes or command sets) which is understood by the VoIP communications service provider, authentication and updating for added (telephony) services is readily achieved automatically and remotely without burdening the VoIP communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone application specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to particular embodiments, a client-specific control engine can send requests to a Web server and get control directive responses for processing, thereby operating in a stateless manner that is similar to HTML/Internet browser. The client-specific control engine can interpret the received control directives and render (execute) building blocks. Each building block can define functions relating to voice, call control, and flow control logic. The client-specific control engine may also execute other types of code, such as Javascript, to create dynamic content for client-side flow control. A control directives document may have URL links to a web server for iterative processing, or it may include query requests for retrieving data from various sources. A query could be formatted for consistency with the source of the data (e.g., by using JavaScript Object Notation (JSON) to retrieve data from third party application servers or from the VoIP server provider's cloud database). This information can then be used to drive call flow or call control decisions.

In various embodiments, flow control decisions are based upon code running on the client side or on the server side. As non-limiting examples, a client side computer system could run code that is written using Javascript or TCL while a server-side computer system might run code that is written using PHP, NodeJS, Python, Scala, Ruby, .Net, or other web languages. For example, a customer can write Javascript applications that are configured to receive call event notifications from the VoIP servers and to generate client-specific control data responses that are provided back to the VoIP servers. In some embodiments, a client-specific control engine may generate queries to various databases, whether the database is controlled by the client or VoIP provider.

Consistent with certain embodiments, the call control engine and high-level programming language interface may provide options that allow for authorization and authentication services to be accessed and used as part of the call control functions. For example, the high-level programming language can be used to direct the call control engine to access an authentication server that performs verification (and grant) of access rights for certain databases or services.

According to embodiments of the present disclosure, the VoIP servers can be configured to use different high-level programming languages for different functions, where each programming language has a different set of commands. For example, a first high-level programming language can be used to create documents that control call routing decisions for high volumes of call traffic, as might occur at the edge of a VoIP provider's system. These call routing decisions can, for example, identify a particular branch office or an IPBX of a particular customer. The identified IPBX might then have additional documents written to communicate using a second high-level programming language that is tailored toward more specific call processing capabilities that might be associated with a particular account or another identifiable grouping. The distinction between the two programming languages can be particularly useful in terms of improving the scalability of the system. For instance, the language used for call routing decisions can be relatively light weight, with fewer commands and capabilities. In particular implementations, the first (call routing) language can contain a subset of the commands available in the second (call processing) language.

Various embodiments of the present disclosure are directed toward VoIP servers that are designed to provide options for dynamically updating and accessing control directive documents using the high-level programming language. For instance, the VoIP servers can be configured to facilitate uploading of new control directive documents as desired by a customer. Consistent with certain embodiments, the VoIP servers can be configured to allow for complex hierarchal solutions that can improve scalability of the system. For example, call control decisions that are shared between certain groups of accounts can share a common template control directive document that can be updated once for all of the groups. The shared control directive document can link to other control directive documents that are specifically tailored to individual accounts in order to provide individual customizable options. Consistent with some embodiments, there can be multiple levels of shared control directive documents and scripts. For example, a first template control directive document might specify call processing functionality for an entire company. A second set of template control directive documents could be used at a country level (e.g., one template control directive document for the United States and one template control directive document for Canada). A third set of template control directive documents could then be used for each branch or store of the company. Finally, individual control directive documents could be used for each individual account. The shared, higher-level files can be updated once for a potentially large number of individual accounts, while still providing a level of individual configurability for each of the accounts.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the VoIP servers. Within these constraints, a customer can write XML code that self-describes the building blocks used in the customer's particular application. Another aspect of the call processing XML is that it allows for various different data structures to be embedded into the XML document or file. For example, a script written in Javascript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s).

As described in more detail with reference to the figures, one or more client-specific control engine(s) and/or control directives may be configured to adjust provided services, acquire data metrics and/or analytics, and/or trigger various other action at multiple organizational levels of a client entity. In some embodiments, different sets of control directives may be used to control from different remote services at different levels and/or gather data metrics from different sources at different levels. Data metrics gathered from one level and/or analytics derived therefrom may be used by control directives to control remote services provided for a different level of the client entity.

Using the respective client-specific set of data for an entity of the requesting endpoint, the telecommunications-providing server can selectively revise caller IDs provided for respective VoIP calls. The caller ID can be revised based on the client-specific set of data for a respective client entity, which can include a set of rules for revising caller IDs for the entire entity, for specific geographic regions, for specific offices, and/or particular endpoints. For example, as described above, the telecommunications-providing server receives a request for a VoIP call at a port and which includes a data packet. The data packet identifies the endpoint requesting the call and the endpoint being called. Using the data packet, the telecommunications-providing server identifies a respective client entity and corresponding client-specific set of data that is associated with the requesting endpoint. The telecommunications-providing server, using the client-specific set of data, determines if a caller ID should be revised for the VoIP call. The caller ID can be revised based on the client-specific sets of data, based on an identifier that corresponds to the requesting endpoint (e.g., the extension), and based on the determined geographic region (of the called endpoint and/or where the requesting endpoint is physically located). In some embodiments, using the data packet, the telecommunications-providing server determines a geographic location where the requesting endpoint is physically located (e.g., an assigned mapping through which a set of private IP addresses in the private network is associated with a set of public IP addresses and/or NAT'd data), which is used to determine if the caller ID should be revised. In other embodiments, the telecommunications-providing server compares an area code of the called number to the extension of the requesting endpoint to determine if the caller ID should be revised.

In some specific embodiments, the determination can include identifying a set of rules for revising caller IDs for the client entity and determining if the VoIP call requested and/or the requesting endpoint satisfy the rules. The set of rules can identify endpoints of the respective client entity that (via the telecommunication-providing server) are to have revised caller IDs. As a specific example, the set of rules for an client entity may include that all endpoints of a particular geographic region have caller IDs revised to be a phone number that is within a threshold distance of a called number (e.g., to an endpoint of the public network and/or an endpoint of private network but that corresponds to a different entity). As another specific example, the set of rules may identify a subset of endpoints located in a particular geographic region that always have revised caller IDs and/or during a particular period of time have revised caller IDs. In response to the VoIP call requested and/or the requesting endpoint satisfying the rules, the telecommunications-providing server revises the caller ID for the VoIP call from the assigned or previous caller ID to a revised caller ID that includes a local number identified by the determined geographic region. Specifically, the revised caller ID can be revised from the extension or identifier corresponding to the requesting endpoint to a local number based on the determined geographic region, which is where the requesting endpoint is physically located and/or is based on the local number or geographic region of the called number.

The telecommunications-providing server, responsive to an indication that a local line should be accessed, in some embodiments, activates an ATB by providing control data (e.g., derived from control data sent by the telecommunications-providing server and/or a related server in the determined geographic region) to the ATB circuit. In specific embodiments, the ATB circuit can be activated by the control data that is provided by the telecommunications-providing server and/or the region-based NAT circuit. The telecommunications-providing server and/or the region-based NAT circuit can send the control data to the ATB circuit using the identifier among the second set of respective IP addresses. In various specific embodiments, the region-based NAT circuit is used to replace the first IP address in a source address of the received data packet with the second IP address to produce a NAT'd data packet. The NAT'd data packet is used as information (such as the control data or a portion thereof), for connecting over the local line through the ATB circuit. The ATB circuit responds to the control data by connecting to the local line, such as a local dedicated line and/or a PRI line. In response to the activation, the call associated with the data packet received at the first port (of the telecommunications-providing server) is redirected to the public network by obtaining a dial tone and passing at least a subset of the data packet through the ATB circuit.

Alternatively and/or in addition, the data packet (or an additional data packet requesting an additional VoIP call) may indicate that the called endpoint is within the private network and/or that a local line may not connect to an emergency service provider. For example, in some geographic regions, such as France or other countries, the telecommunication service provider may be unable to issue emergency services on existing numbers in the area. The telecommunications-providing server can access and pass a provisioned VoIP number for connecting to the endpoint identified, such as the emergency service provider. The provisioned VoIP number can include a local number of the geographic region which the requesting endpoint is physically located and that is registered with the emergency service provider. In specific embodiments, the telecommunications-providing server can set aside a plurality of provisioned VoIP numbers that are set aside for the different geographic regions corresponding to the respective client entity and used for connecting VoIP calls (such as for emergencies).

The data packet may indicate that the requesting endpoint is calling another endpoint in the private network. The telecommunications-providing server can bridge or route the VoIP call for communications between the requesting endpoint and the called endpoint. In some specific embodiments, an entity may indicate to revise the caller ID when an endpoints calls another endpoint within the private network using the client-specific set of data. In response to the data packet identifying the call is to another endpoint in the private network, another identifier among the second set of respective IP addresses is used to cause a call associated with the data packet received at the first port of the telecommunications-providing server to be bridged (or routed) for communications between the requesting endpoint identified by a first IP address of a set of private IP addresses and a called endpoint associated with the second IP address of the set of private IP addresses.

As a specific example, a first client entity may be attempting to communication with an endpoint at a second client entity that is a customer of the first client entity. As another more specific example, a restaurant corporation and a food delivery corporation both use the telecommunication service provider for remote calling services. A manager of the food delivery corporation places a call to a manager of a particular chain of the restaurant corporation as a sales call. The food delivery corporation can control the caller IDs displayed such that the call appears to be local to the particular chain of the restaurant corporation, even if the manager of the food delivery corporation is physically located in another state. As another example, an employee of an insurance company may be a sales account manager for multiple states and often travel to different local offices. When the sales account manager is located at a particular office and calls an endpoint associated with a second employee located at the particular office, the insurance company may change the caller ID used for the VoIP call so that the second employee is aware where the sales account manager is presently located and/or which room the sales account manager is located. When the sale account manager calls endpoints of other offices and/or endpoints of the public network, the caller ID may not be revised (or may be in some cases).

The telecommunications-providing server can set aside a plurality of provisioned VoIP numbers that are set aside for each of the different geographic regions. In this manner, the client entity and/or telecommunication service provider can avoid provisioning local numbers individually for each call (e.g., avoid provisioning thousands of numbers). For example, a first geographic region has a first set of provisioned VoIP numbers and a second geographic region has a second set of provisioned VoIP numbers. In some embodiments, the provisioned VoIP numbers can be associated with particular client entities and/or emergency service providers. As described above, one or more provisioned VoIP numbers can be registered with the emergency service provider. The telecommunications-providing server can pass one of the provisioned VoIP numbers for the determined geographic location through the ATB circuit and/or through the telecommunications-providing server for connecting to a number being called.

In accordance with many embodiments, the VoIP system can provide the communicated data packets between a public network and a private network using a region-based NAT. In response to a data packet from a first port of a private IP address, used to identify an endpoint in the private network, a geographic region of the private network that includes an endpoint identified by the private IP address is determined. A public IP address is selected from a set of public IP addresses that is mapped to the determined geographic region in the database. An available port of the selected public IP address is assigned for NAT. NAT is performed for data communicated between the public and private networks using a mapping of the first port of the first IP address to the second port of the second IP address.

Different embodiments may utilize various circuit arrangements to perform region-based NAT. In certain embodiments, a region-based NAT circuit includes a first network interface circuit configured to communicate data over the private network using a set of private IP addresses to identify endpoints in the private network. The region-based NAT circuit also includes a second network interface configured to communicate data over the public network using a set of public IP addresses to identify the endpoints. A NAT processing circuit coupled to the first and second interfaces is configured to perform the region-based NAT using respective subsets of the set of public IP addresses specified for each of the geographic regions in a database.

The processing circuit may perform region-based NAT using various processes. As an illustrative example, the NAT processing circuit may perform region-based NAT by performing operations including:

1) in response to a data packet from a first port of one of the private IPs, determining which of the plurality of geographic regions the endpoint identified by the first private IP address is located;
2) selecting a second IP address from a subset of the second set of IP addresses specified for the determined geographic region in the database;
3) assigning an available second port of the selected IP address for NAT; and
4) performing NAT for data communicated between the public and private networks using a mapping of the first port of the first IP address to the second port of the second IP address.

In some embodiments, the region-based NAT circuit may include additional circuits configured to perform one or more of the above operations. For example, in some embodiments, the region-based NAT circuit may include a region determination circuit configured to determine the geographic region-based on the private source IP address indicated in the data packet. The geographic region may be determined, for example, by looking up the geographic region in a stored table mapping the private IP addresses to the geographic regions. As another example, the region-based NAT circuit may include a mapping circuit configured to determine the subset of public IP addresses to be used for NAT for the determined region. The mapping circuit may determine the subset of public IP addresses, for example, by retrieving the subset of public IP addresses from a database mapping the public IP addresses to the geographic regions in the private network.

In certain embodiments, region-based NAT is used to facilitate location-based routing of data in private networks. In location-based routing, the resources (e.g., network paths and/or data servers) used to provide service to endpoints may be adjusted based on the geographic location of the endpoints. Location-based routing may be used, for example, reducing latency, enhancing quality, and/or improving efficiency in many network applications. Additionally or alternatively location-based routing may be used to enhance security for network communication. For instance, due to political, security, or compliance concerns, the traffic from a specific geographic region might need to be handled in a certain way (through a particular route/data center, etc.).

In a public network, geolocation of an endpoint can be obtained, for example, based on a public IP of the endpoint from IP registration data, IP geolocation services, or various other sources that correlate an IP address with a geolocation. However, it can be difficult to distinguish and determine location of endpoints in a private network after NAT has converted private IP addresses to one or more shared public IP addresses. One or more embodiments utilize region-based routing to facilitate location-based routing in private networks. Region-based NAT allows the geographic location of endpoints in the private network to be identified at a region level based on the public IP used for NAT and communication via the public network. Since region-based routing performs NAT using a different subset of public IPs for each geographic region, a public network device (e.g., a server) may determine the geographic region of a private network endpoint based on the public IP used to identify the endpoint on the public network, or in some embodiments, based on the combination of the public IP and private IP as a tuple, which can provide further accuracy. The geographic region may be determined from the public IP using, for example, a database that maps each geographic region to the public IPs used for NAT. The IP to geographic region mapping data may be stored in a local database (e.g., in a memory of the public network device) and/or may be stored in a remote database communicatively connected to the device (e.g., via the public network). The private IP address can further be used for granular location of the person within a building, structure, and/or campus, among other locations.

After determining the geographic region of the endpoint, a public network server may select resources to provide service to the endpoint based on the determined geographic region. For example, a server may select the network paths for communicating data to the endpoint based on the geographic location of the server and the geographic region of the endpoint. In different implementations, a server may cause data to be routed over the select path using various processes. In some implementations, the server may control routing of data by selecting from a plurality of internet service providers to communicate the data over the public network. Additionally or alternatively, the server may control routing by prepending routing table entries provided to routing nodes connected to the server in the public network. Prepending may cause a routing node to believe a connection between the node and the server includes a larger number of network hops than the actual number of hops. By prepending entries provided to certain routing nodes, data paths used to route data from the endpoint to the server can be manipulated. Conversely, in some embodiments, the server may cause an access point or other device in the private network to prepend routing table entries to manipulate data paths used for routing data from the server to the endpoint.

Additionally or alternatively, in some embodiments, server(s) to be used to provide service for an endpoint may be selected based on the determined geographic region. For instance, a service provider may have multiple servers geographically distributed in a public network for providing service to endpoints. When a service request is received, one of the servers may be selected to provide service to the endpoint based on the determined geographic region of the connected endpoint. For instance, connection requests may initially be received by a load distribution server configured to assign one of the servers to provide the respective service based on the geographic region. In some embodiments, the load distribution server directs the selected server to respond to the service request and provide the requested service to the endpoint. Additionally or alternatively, the load distribution server may direct the requesting endpoint to contact the selected server for service.

The load-distribution server may be incorporated into various devices on the public network. In some embodiments, the load-distribution server may be incorporated with one or more of the servers available for selection. For example, each server may be configured to select one of the servers, based on geographic region, in response to receiving a service request from an endpoint. If the server selects itself, the server communicates with the endpoint to provide the requested service. Otherwise, the server directs the selected server and/or endpoint to cause the selected server to provide the requested service for the endpoint. As another example, in some embodiments, the load-distribution server may be implemented by domain name server (DNS) in the public network. For example, the DNS may be configured to direct an endpoint to contact different ones of the servers by controlling the IP address(es) that is provided in response to a domain name query. In some embodiments, the load-distribution server may select a subset of the servers based on the determined geographic region and direct the endpoint to select and contact a server of the subset for service. The endpoint may select a server from the subset, pseudo randomly, based on weightings provided by the load-distribution server, and/or based on various other criteria (e.g., network performance, available access points, and/or user preferences).

In some embodiments, selection of resources for providing the requested service to the endpoint may additionally or alternatively select one or more nodes in the private network, for communicating data with the endpoint, based on the determined geographic region. For example, endpoints in a particular region of a private network may be able to connect to the public network via multiple access points. For instance, a private network may be connected to the internet by access points for multiple types of connections (e.g., DSL, cable, fiber, and/or satellite) and/or by multiple internet service providers. The access point used for communication between the server and the endpoint may be selected based on various parameters in addition to or in lieu of the geographic region of the endpoint including, for example, geographic location of the endpoint and/or server, transmission characteristics of connections between the access point and the endpoint and/or server (e.g., bandwidth, latency, dropped data packets, BER, and/or traffic load), type of data to be communicated (e.g., text, images, webpage, voice/audio, and/or video), or various combinations thereof. Values of the parameters may be specified for each access point, such as, in the database that maps the geographic regions to the public IP addresses used for network address translation. Alternatively or additionally, the values of the parameters may be retrieved from one or more other data sources including, for example, internet-connected data repositories, and/or third-party data subscription services. If the selected access point is different than the access point used to communicate the service request, the load-distribution server may prompt the endpoint to contact a selected server via the selected access point. Contacting the selected server via the selected access point causes the NAT circuit to assign the endpoint an available port of the public IP address used for NAT for the selected access point.

Resources (e.g., servers, data paths, and/or access points) used to provide a requested service to an endpoint for routing data via public and/or private networks may be selected using various processes. In some embodiments, resources may be selected according to a selection algorithm specified in a configuration settings file. The configuration settings file may be stored locally or in a remote database. The selection algorithm may select resources based on various criteria including geographic region of the endpoints, transmission characteristics in the public and/or private networks (e.g., bandwidth, latency, dropped data packets, and/or BER), traffic load of available access points and/or servers, date, time, or various combinations thereof. The selection algorithm may select resources to improve various operating parameters. For example, resources may be selected to reduce latency by circumventing delays attributable to longer and/or congested data paths on the public and/or private networks, balance load between network resources, and/or improve routing efficiency on geographically diverse private networks.

In some implementations, the algorithms/criteria for selection of resources may be implemented using one or more machine learning algorithms (e.g., an evolutionary algorithm). The machine learning algorithm may be evaluated and adjusted in a training process to improve performance and/or accuracy of the algorithm. Training may include supervised or unsupervised learning. In some embodiments, a settings selection algorithm may be adjusted to use a different weighting of parameters on a trial basis. If the modified settings selection algorithm improves performance in the network(s), the modified settings selection algorithm may replace the current settings selection algorithm. Otherwise, the modified settings selection algorithm may be discarded.

The disclosed embodiments may be adapted to facilitate location-based routing for various types of communication of various types of data. While embodiments are not so limited, for ease of explanation, the examples are primarily described with reference to servers configured to provide VoIP services for endpoints. Further, while the above discussion refers to use of NAT for communicating within network, embodiments in accordance with the present disclosure do not necessarily require use of region-based NAT. For example, an assigned mapping can be used that maps private IP addresses in the private network with a set of public IP addresses and can be used to identify geographic regions corresponding to the public IP addresses.

For ease of explanation, the examples are primarily described with reference to selecting resources when service is initially requested by an endpoint in a private network. However, the embodiments are not so limited. For example, in some implementations, resources may be dynamically selected and/or adjusted while providing service to an endpoint. For instance, a selected server may be configured to monitor various parameters while providing the service to the endpoint. The monitored parameters may include, for example, geographic location of portable endpoints (e.g., wireless connected endpoints) in the private network, transmission characteristics of the data paths in the public and private networks (e.g., bandwidth, latency, dropped data packets, BER), traffic load of the access point and/or servers, type of data to be communicated (e.g., text, images, webpage, voice/audio, and/or video) or various combinations thereof. Responsive to the monitored parameters, the server may select different resources to continue providing service for the endpoint.

According to one or more particular embodiments, a particular client entity establishes control over revising caller IDs for endpoints using a client-specific set of data. The client-specific set of data is communicated to the telecommunications-providing server via an interface protocol. A sales person that is located in Miami, Fla. calls a customer that is located in Columbus, Ohio. The customer has an endpoint that is part of the public network. The sales person initiates the VoIP call by dialing the telephone number of the customer with a digit as a prefix (e.g., 8-650-123-1234). In response to dialing, the endpoint that the sales person is using outputs a data packet to the telecommunications-providing server to request the VoIP call. The data packet identifies the requesting endpoint, the called endpoint, and the geographic regions in which the customer and the sales person are located. The telecommunications-providing server uses an identifier of the requesting endpoint to determine the client entity that is associated with the sales person and corresponding set of rules for revising caller IDs for the entity (e.g., using the client-specific set of data). The set of rules indicates that the sales person should have revised caller IDs when the called number is greater than 20 miles away. The telecommunications-providing server compares the geographic region of the identifier corresponding to the requesting endpoint to the determined geographic region that the customer is located (e.g., using the area code of the called number and the area code of the extension of the endpoint). In response to determining that the local number of Columbus, Ohio is a geographic region that is more than 20 miles away from Miami, Fla., the telecommunications-providing server revises the caller ID to a local number of Columbus, Ohio, and activates the ATB to connect to a local line and bridge the call to the customer using the revised caller ID.

If the customer is instead located in Miami, Fla., the telecommunications-providing server actives the ATB to connect to the local line and bridge the call using the original caller ID (e.g., that corresponds to the requesting endpoint). Further, if the customer is associated with an endpoint of a private network, the telecommunications-providing server can be used to provide the communication.

The company of the sales person can have offices throughout a particular country and/or the world. A set of local numbers in different geographic areas are provisioned for the company. Sales persons at different offices can have their outbound caller IDs dynamically adjusted and selected from the set of local numbers for the company based on the number that is called and the area of the number that is closest (distance and/or area code wise).

As another example, an employee of a company may travel for work and uses their mobile phone for communication purposes. While the employee is travelling to a company office in Florida, the employee encounters an emergency situation and makes a call to an emergency service provider (e.g., dials 8_911 or 911), such as a call to the local police. The employee's caller ID, if un-revised, will appear as a non-local number and will not indicate the employee's location to the police. In response to dialing the emergency number, a data packet is provided to the telecommunications-providing server. The data packet identifies the requesting endpoint, the called endpoint is an emergency service provider, and the geographic regions in which the requesting endpoint is physically located. For example, the telecommunication service provider identifies the endpoint of the employee is associated with another geographic region, Wisconsin, and that the endpoint is presently located in Florida based on a public IP address provided in the data packet. The public IP address is compared to a database to identify if the public IP address is known.

In a number of specific embodiments, the telecommunication-providing server can identify an emergency service is being called based on the dialed number and, optionally, client-specific data sets (e.g., identifying emergency service number in particular geographic regions, like France). The telecommunication-providing server can identify the physical location of the employee based on the public IP address and the client-specific data sets. In a specific example, the call from the company office in Florida is NAT'd to the same public IP of other known endpoints in the Florida office. The telecommunications-providing server compares a geographic region that the user is assigned to, using an identifier, (e.g., Wisconsin) to the current physical location (e.g., Florida). In response to the employee being at a different physical location than assigned, the telecommunications-providing server revises the caller ID to a local number identified by the current physical location. If the physical location is the same, the caller ID is not revised.

In some geographic regions, an emergency service cannot be issued on existing numbers in the areas, such as in France. For example, assume, an employee of a client entity is physically located in France when calling the emergency service, the telecommunications-providing server accesses and passes a provisioned VoIP number for connecting to the emergency service provider. The provisioned VoIP number includes a revised caller ID having a local number of the geographic region which the requesting endpoint is physically located and that is registered with the emergency service provider. The telecommunications-providing server connects the VoIP call, between the requesting endpoint and the receiving endpoint, by accessing and passing the provisioned VoIP number which includes the local number as the revised caller ID.

In some instances, when a revised caller ID is provided, the called endpoint may call back. For example, the employee calls the police and hangs up before all information can be obtained. In other examples, the sales person calls a customer and does not reach them or for other reasons the customer calls back. As a revised caller ID is provided, the emergency personal and/or customer are calling a number that is not immediately associated with the person that called. The telecommunications-providing server receives the request for the call that includes the revised caller ID and looks up (in a database and using the client-specific sets of data) what endpoint in the private network last made a call using the revised caller ID. In case of a call back for a non-emergency call (e.g., a sales call), other information can be used to make decisions on handling of the call back. The other information can include the age of the call/how long ago the originating call was made, and/or information from external sources such as a customer relationship management (CRM) application or an enterprise resource planning (ERP) application. Otherwise, in response to identifying the previously requesting endpoint, the call is redirected to an extension of the requesting endpoint and which corresponds to an extension/telephone number that is different than the revised caller ID. As a specific example, the employee in Florida, whom has an extension local to Wisconsin, calls the police with a revised caller ID showing a local number in Florida. The employee accidentally hangs up and the police call back using the revised caller ID. The telecommunications-providing server receives the request for the call and identifies that the employee last made a call using the revised caller ID for the local number in Florida. Based on the identification, the call is redirected to the extension of the employee (e.g., a local number in Wisconsin). If the employee does not answer the call back from the police, the telecommunications-providing server redirects the call from the police to an extension determined by the physical location where the employee is located (e.g., the Florida office). The extension is identified based on the client-specific set of data and can include an identified front desk or security service of the client entity associated with the employee. Although the above-describes a callback from an emergency service, embodiments are not so limited, and callbacks can be from customers and/or for other commercial uses that can be performed in a similar manner.

Turning now to the figures, FIG. 1A shows a communication network 100, configured in accordance with one or more embodiments for communicatively coupling a private network 114 with a plurality of data servers (e.g., sometimes herein referred to as VoIP servers and/or telecommunications-providing server) 102 and 104 connected in a public network 108 (e.g., the internet). The data servers are configured to provide telephony/communications services (such as a telecommunications-providing server for providing VoIP telephony services as exemplified by 8×8, Inc.) to endpoints connected via one or more networks.

The telecommunications-providing server(s) 102, 104 can allow for an entity to revise caller IDs presented for a VoIP call when communicating between the private network 114 and the public network 108. In specific implementations and for a variety of purposes, the caller IDs are revised to reflect a current physical location of the requesting endpoint or the geographic region of the called or receiving endpoint based on the needs of the specific client entity. The control is provided by communicating client-specific sets of data that are indicative of client-specific communication routing and/or client-specific communication data and over an interface protocol using a processing circuitry (e.g., the client-specific control engine 112). The client-specific sets of data can include a set of rules indicative of when and how the telecommunications-providing server should revise caller IDs. The set of rules for a particular client entity can be across the entire entity (e.g., high level), specific to particular geographic regions (e.g., intermediate level), and/or specific to particular endpoints (e.g., low level).

A private network 114 is connected to the public network 108 by a region-based IP-address mapping circuit (such as via NAT circuit 110). The private network 114 includes a plurality of endpoints 130, 132, 134, 136, 138, 140, 142, and 144 distributed across a plurality of geographic regions 120, 122, 124, and 126. The private network 114 includes a set of access points 116 or 118. Each access point communicatively couples endpoints in one or more of the geographic regions 120, 122, 124, and 126 to the public network 108. In this example, the endpoints in the private network 114 are connected to the public network 108 via multiple access points. For instance, endpoints in each of the geographic regions 120, 122, 124, and 126 are connected to each of the access points 116 and 118 either directly or indirectly via the other access point. Various embodiments may include more or fewer access points.

The endpoints 130, 132, 134, 136, 138, 140, 142, and 144 in the private network 114 can have extensions (e.g., phone numbers) that are associated with the geographic region 120, 122, 124, and 126 the respective endpoint is distributed in. When placing VoIP calls, the extension (e.g., assigned extension) is used as a caller ID and includes a local number of the respective geographic regions. As a specific example, a first endpoint 130 is associated with Florida and has the caller ID of a local phone number in Florida. One or more of the endpoints can be mobile, such as a mobile phone and/or computing device. When the endpoint is located within a different geographic region then the respective geographic region it is assigned to, VoIP calls from the endpoint use the same respective caller ID (e.g., local phone number for Florida) such that the VoIP call appears from the same telephone number regardless of where the user is located. The client entity may customize revisions of the caller IDs of endpoints to reflect the current location of the endpoint and/or to reflect a geographic location of the telephone number being called.

For the above-described embodiments and those following, unless otherwise indicated, an ATB circuit can be implemented as needed for the embodiment/application as appropriate. The private network 114 can include a plurality of ATB circuits 146, 148, 150, and 152 distributed across a plurality of geographic regions 120, 122, 124, and 126. As examples and depending on the embodiments/applications, such an ATB circuit is implement using, or includes or refers to, any of various types of gateway circuits configured to provide a communication connection between a private/public network and one or more analog lines such as a fixed/land line or other line requiring an analog connection. In connection with the contexts illustrated herein, for example, each geographic regions 120, 122, 124, and 126 can include an ATB circuit connected to one or more local lines. Example such ATB circuits include an ATB implemented on/at an endpoint of the private network, using the ATB circuit as a conventional stand-alone analog telephone adapter (ATA), or by so configuring a private-branch-exchange (PBX) circuitry which directly connects to the analog line or indirectly connects to the analog line through integrated circuitry acting similar to an ATA. As another example, the ATB circuit can be implemented using a primary rate interface (PRI) circuitry. In such contexts, the ATB circuit can connect to a local line 154 via calls redirected as described above between the private and public networks, as applicable for needs such as defined by specific emergency-service providers and/or endpoints that are not part of the private network (e.g., local or toll free telephone numbers). In a more specific embodiment in which the ATB circuit is an ATA that connects to a local line, the ATA is responsive to and/or uses control data for connecting to the local line includes and may require obtaining a dial tone using the local line. In other embodiments in which the ATB circuit does not include an ATA, similar operations would be carried out using a related communications circuit controlled by one of the (VoIP-enabled) servers, whereby the communication circuit responds to the control data by connecting to the local (analog) line whether a dedicated local line or to any combination of one or more land lines.

Although the embodiment of FIG. 1A illustrates a single local line connected to the particular ATB circuit 152, one may appreciate that each of the ATB circuits illustrated are associated with one or more local lines. Similarly, embodiments include a plurality of different client-entities, and are not limited to one client entity (client A) as illustrated by FIG. 1A.

As a specific example, a user using an endpoint within the private network 114 may call an emergency service provider, such as the local police (e.g., 911 in the United States, 999 and/or 112 in the United Kingdom). Assume a local branch is located in the United Kingdom and the telephone extension for the local branch is 209X (e.g., 2095, 2096). When a user dials 112 to call the police using the particular endpoint 144, a respective ATB circuit 152 is activated. The ATB circuit 152 has a local line 154 connected to it, such as a local dedicated line and/or a PRI line, and is used to automatically dial 112 on the public network 108 and bridges the call. The address registered is the address of the local line 154 and the emergency call is directed properly using the ATB circuit 152. Each branch of the private network 114 can correspond with a geographic location. The emergency service provider (e.g., 152) has a 112 extension locally, and globally, the extension is unique so that the calls are correctly routed (e.g., 432112, 433112, 434112). A user at the particular branch can dial 112 (or 911), and the system identifies the correct branch and routes the call via the identification (e.g., 432112).

As another specific example, a user using an endpoint 142 within the private network 114 calls a local telephone number and/or a toll-free telephone number. A digit can be used as an extension number provided to the ATB circuit 152 with connectivity to the public network. For example, the user may dial an 8 to enable the ATB circuit 152. In response to dialing the 8 on the endpoint 142 and the ATB circuit 152 being activated, the ATB circuit 152 opens the local line 154 and the rest of the digits dialed by the user are passed through the local line 154 (e.g., as a dual tone multi frequency (DTMF)). Accordingly, the local line dials the remaining numbers. For example, if a user dials 818001231234 on the endpoint 142 with the private network 114, the ATB circuit 152 is activated and, using the local line 154, the number 1-800-123-1234 is dialed. The digit (e.g., 8) can appear as a prefix to dial local or toll free numbers from within the private network 114. After the digit is dialed, no waiting occurs as the ATB circuit is activated and the remaining digits are passed quickly by the ATB circuit via the local line to call the local or toll free number.

An endpoint that is part of the local branch can utilize the ATB circuit from a variety of geographic locations. As a specific example, the endpoint 144 can include a cellphone and/or other mobile device that can be utilized to make telephone calls. Regardless of the physical location where the endpoint 144 is located, the user can connect to another endpoint within a public network 108 via the ATB circuit 152. For example, the user dials the number (e.g., 911 or other emergency number and/or a local or toll free number starting with a digit) and the call is connected to the endpoint of the public network 108 utilizing the ATB circuit 152 with the local line 154 connection in that local branch. Specifically, the mobile phone application provides data to a cloud system, the cloud system provides data to the ATB circuit 152 via a NAT circuit 110, and the ATB circuit 152 directs a call to the endpoint with the public network (e.g., the local service provider 156) via a local line 154 connected to the ATB circuit 152.

The caller ID presented to the called party can include an identifier (e.g., extension) that corresponds to the requesting (e.g., callee) endpoint. As an example, the particular endpoint 144 is a cellphone having an extension of 1-650-123-1234. The caller ID presented for calls requested by the endpoint 144 can be 1-650-123-1234 regardless of a physical location that the endpoint 144 is at. In some embodiments, the caller ID may be revised based on a client-specific data set. The client-specific data sets can be controlled by the clients remotely from the telecommunication service provider, such as by using the client-specific-control engine 112.

The communication network 100 includes one or more processing circuits configured to implement client-specific control engine 112, which is configured to adjust the VoIP communications provided for each client account according to a set of control directives. For instance, the client-specific control engine 112 may adjust routing of a VoIP call for a client account by generating client-specific sets of control data to the telecommunications-providing server 102. For example, the client-specific control engine 112 may generate client-specific sets of data (e.g., control data) by processing the respective set of control directives for the account in response to VoIP call event data or other data prompts received from the telecommunications-providing servers 102, 104. The control directives for a client account may be configured to adjust routing of a particular VoIP call in response to call event data indicating a new incoming call to an endpoint of the client account. Further, the client-specific control can allow for a client entity to revise caller IDs presented for a VoIP call when communicating between the private network and the public network. Although the embodiment of FIG. 1A illustrates a single client-specific control engine, embodiments are not so limited and can include a plurality of client-specific control engines. For example, each client entity that is a customer of the telecommunication service provider can have and/or can access a client-specific control engine.

Different embodiments may process the control directives differently to make control decisions for the client entity. For instance, in some embodiments, the control directives may be executed on a processor. Additionally or alternatively, control directives may be specified using a high-level programing language that is compiled and executed in a virtual language environment (e.g., Java). Additionally or alternatively, control directives may be specified in a look up table that is accessed in response to call events. Additionally or alternatively, the directives may describe circuits (e.g., in a hardware descriptive language) that are hardware accelerated by implementing the circuit in a field programmable gate array.

The control directives for a client account may generate the client-specific sets of control data based on various data metrics including, for example, VoIP call events or data received from the VoIP communication server, user input (e.g., input via dial-tones and/or GUI), data acquired from a client entity (e.g., from a client database), and/or data provided by third parties (e.g., third party monitoring services). The client-specific control engine 112 communicates the client-specific control data to the VoIP communication server(s) using an interface protocol having an instruction format that is independent of an instruction format used to implement the client-specific control engine 112 and/or client-specific control directives. The independent instruction format of the interface protocol allows clients to write control directives including complex logic and various data sources, for example, using various different high-level languages without regard to the particular language used to implement or communicate with the VoIP computing server. For example, a set of control directives for a first client entity may be defined using a first instruction language that is different than a second instruction language used by a client-specific control engine to communicate with the VoIP server. A set of control directives for a second client entity may be defined using a third instruction language that is different than the first and second instruction languages. In some embodiments, the instruction set of the interface protocol may be configured to limit customer control over certain VoIP communication settings—thereby preventing clients from disrupting operations of the computing service with faulty client-specified directive code.

Different embodiments may implement the client-specific control engine(s) 112 in various locations. For example, client-specific control engine(s) 112 for one or more client accounts may be implemented in a central server connected to, or incorporated with, the telecommunications-providing server(s) 102, 104. Additionally or alternatively, one or more client-specific control engines 112 may be implemented by one or more processing circuits maintained by the client entity (e.g., server/database). Similarly, the control directives may be stored locally within the client-specific control engines, or stored remotely (e.g., in a centralized database, in a database maintained by the client entity or a combination thereof).

As previously described, client-specific control engines may be used to facilitate adjustment of a variety of remote services including, for example, VoIP communication services such as VoIP calls, revised caller IDs, audio and/or video conferencing, IPBX exchange servers, packet switching, and traffic management as well as non-VoIP services including, but not limited to, website hosting, remote data storage, remote computing services, and/or virtual computing environments.

As an illustrative example, a VoIP service provider may include a plurality of geographically distributed VoIP servers (e.g., telecommunications-providing server 102 and 104 which can include SIP and/or media relay servers) for routing of VoIP calls. When a VoIP server (e.g., 102) receives a service request (e.g., endpoint registration and/or connection request) from a private network endpoint, the VoIP server can determine the geographic region of the registering/calling endpoint (or callee endpoint). Using the geographic regions, the telecommunications-providing server 102 can select one of the available telecommunications-providing servers 102 and 104 to provide VoIP service for the endpoint, select data paths (e.g., telephone and/or data carriers), and/or select various other resources for connecting to the endpoint as previously described.

In specific embodiments, the region-based NAT circuit 110 is used to perform region-based NAT using an exclusive subset of public IP addresses for each respective one of the geographic regions 120, 122, 124, and 126. In this example, the region-based NAT circuit 110 includes a WAN-side network interface circuit configured to communicate data over a public network 108 (e.g., the internet) using a set of public IP addresses. The region-based NAT circuit 110 includes a LAN-side network interface circuit configured to communicate data over the private network 114 using a set of private IP addresses. A NAT processing circuit performs NAT on data packets communicated between the network interface circuits using a different subset of public IP addresses for each of the geographic regions 120, 122, 124, and 126.

By performing NAT using different public IP addresses for different ones of the geographic regions 120, 122, 124, and 126, geographic regions of the endpoints in the private network 114 may be determined by WAN-side devices based on the public IP address used for NAT. As an illustrative example, one or more servers 102 and 104 connected in the public network 108 may determine a geographic region of an endpoint in the private network 114 in response to receiving a connection request data packet from the endpoint. The server (e.g., telecommunications-providing server 102) may determine the geographic region of an endpoint, for example, by looking up a source IP address of the received data packet in a database 106. The database maps the public IP addresses used for NAT to geographic regions 120, 122, 124, and 126 in the private network 114.

In some embodiments, the one or more of the servers 102 and 104 are configured to perform location-based routing using the geographic region determined for the endpoint. For example, after determining the geographic region of the endpoint requesting service, a server (e.g., 102) may select various resources to provide the requested service to the endpoint based on the determined geographic region. In some embodiments, resources are selected by one of the servers available for providing the requested service to the endpoint. Alternatively or additionally, the resources may be selected by a separate server (e.g., a load-distribution server or a DNS).

As previously described, selection of resources may select one of the servers 102 and 104 to provide service to the endpoint, network paths for communicating data to the endpoint, various private network node (e.g., access points 116 and 118), communication settings (transmission protocols, encryption, forward error correction, and/or audio or video codec), or various combinations thereof. The resources may be selected based on the determined geographic region of the requesting endpoint, geographic location of the access point(s) 116 and 118 and/or server(s), 102 and 104, transmission characteristics of the data paths in the public and private networks (e.g., bandwidth, latency, dropped data packets, BER), traffic load of the access point and/or servers, the type of data to be communicated (e.g., text, images, webpage, voice/audio, and/or video), or various combinations thereof.

A telecommunication service provider can convert or translate addresses of endpoints for effective communications within a larger communications network or set of networks. Endpoints in the private network can have various caller IDs that are provided along with a VoIP call and that are associated with different geographic regions of the entity. The respective entity can control various processing, including routing and revising caller IDs, by communicating with the telecommunications-providing server and generating client-specific sets of data. The telecommunications-providing server provides telecommunication services, between endpoints in the private network and/or in the public network, based on the client-specific data sets. For example, an endpoint 130 provides a data packet to a port of telecommunications-providing server 104 to request a VoIP call. In response to a data packet received at a port of the telecommunications-providing server 104 requesting the VoIP call, the telecommunications-providing server 104 determines a geographic region that an endpoint identified using the data packet (e.g., the called or receiving endpoint) is located and whether a local line 154 should be accessed. As previously described, the local line 154 may be accessed when the called endpoint is associated with a land line and/or the public network.

In response to an indication that the local line 154 should be accessed, the telecommunications-providing server 104 revises a caller ID for the VoIP call based on the client-specific sets of data, based on an identifier that corresponds to an endpoint requesting the VoIP call, and based on the determined geographic region. The revision is based on a set of rules established by the respective entity, identification of a physical location of the requesting endpoint 130 and a location of the called number. The caller ID can be revised to a local number identified by the determined geographic region, such as the location of the called endpoint and/or the location of the emergency service provider/where the user is actually located. In various embodiments, the local line 154 is used to connect the call via the ATB circuit 152. In other embodiments and/or in addition, such as for an additional requested VoIP call, the called number is not connected through a local line but through a provisioned VoIP number, such as when calling another endpoint in the private network and/or when contacting emergency service providers through existing local lines is not possible or feasible. The receiving endpoint, in response to the dial tone being connected, receives a transposed number indicating that the call is being made from the local number using the revised caller ID.

In specific embodiments, the telecommunications-providing server 102 can set aside a plurality of provisioned VoIP numbers and/or local numbers for one or more client entities. For example, for a particular client entity the plurality of provisioned VoIP numbers and/or local numbers are set aside for different geographic regions and used for revising caller IDs and/or connecting to the public network. A set of local numbers in different areas can be provisioned for a client entity at the company level. In other embodiments, the provisioned VoIP numbers are used to connect to emergency services when existing numbers in the area may not be used to connect to emergency services. The provisioned VoIP number from the set and which is set aside for the determined geographic region (of the call and/or where the requesting endpoint is physically located) is passed through the ATB circuit 152 for connecting to an endpoint in the public network and/or through the telecommunication providing server for connecting to a telephone number being called. The provisioned VoIP numbers (and/or local numbers used) are associated with a physical address of the respective geographic regions. For example, a provisioned VoIP number that is set aside for Office A of a client entity, which is located in California, is associated with the physical address of Office A in California. In this manner, the emergency service provider can identify the physical address where the calling endpoint is located.

The telecommunications-providing server 102 can determine and revise the caller ID based on the area code of the extension of the requesting endpoint not matching and/or not being within a threshold distance to an area code of the called number (among other rules). Area codes that are not a threshold distance from one another include or refer to area codes that indicate the endpoints calling and being called are a threshold physical distance apart (e.g., not a local call). In some geographic regions, due to populations, multiple areas codes may be used for the same geographic region (e.g., such as a City or Metropolitan area). The client entity can establish the set of rules so that the caller IDs are not changed when the area codes do not match but the area code of the requesting endpoint and area code of the called number indicate the same or similar geographic region.

In other embodiments, the telecommunications-providing server 102 can determine and revise the caller ID based on the requesting endpoint being physically at a different location than the geographic region indicated by the extension of the requesting endpoint. The telecommunications-providing server 102 identifies the physical location based on a public IP address used to send the data packet requesting the VoIP call (e.g., via the mobile application). The public IP address is compared to a database to identify if the public IP address is known, such as using an assigned mapping for the respective client entity (or another client entity). For example, the requesting endpoint can be NAT'd behind the same public IP address as known endpoints in a geographic region and/or that the client entity otherwise registers. The client entity may, in some embodiments, provide identification and location information of public IP addresses that are not part of the private network (e.g., locations that employees frequent, contract locations, temporary rental spaces or other reasons). As a specific example, a user uses their mobile phone for work and is associated with Office A in Florida. The user travels to Office B in Wisconsin for work and while in Wisconsin calls the police using their mobile phone. The telecommunications-providing server 102 identifies that the user is in Wisconsin based on a public IP address in the data packet and/or used to send the data packet (e.g., NAT'd behind the same public IP address as known endpoints at the office in Wisconsin), and revises the caller ID to a local number that is associated with the physical address of the office in Wisconsin. In other embodiments, the telecommunications-providing server 102 can use assigned mappings for a different client entity to determine the physical location. For example, the user may be connected to an emergency service provider using a revised caller ID that indicates a physical address of a different client entity, and without providing the identification of the different client entity to the user or the respective client entity and/or without providing an indication that the different client entity is a customer of the telecommunication service provider (e.g., for privacy purposes).

In various specific embodiments, different VoIP calls requested for users corresponding to a client entity can have caller IDs revised and/or provisioned VoIP numbers accessed and passed to connect respective VoIP calls. The telecommunications-providing server 102, for each VoIP call, can determine if a local line should be accessed and/or if an ATB circuit should be activated, whether a revised caller ID is to be used, and/or whether to access and pass a provisioned VoIP number (as well as selecting the VoIP number). The determination can be based on the client-specific set of data corresponding to the respective client-entity (e.g., a set of rules for revising caller IDs for the client entity), as well as a determined geographic region of the requesting endpoint and, optionally, the called endpoint. In a number of embodiments, the telecommunication-providing server 102 can activate an ATB circuit for a first VoIP call and revise the caller ID (as previously described) and can connect a second VoIP call by accessing and passing a provisioned VoIP call based on the client-specific sets of data. The first and second VoIP calls can be for the same for the same client entity or different client entities.

Figure 1B:
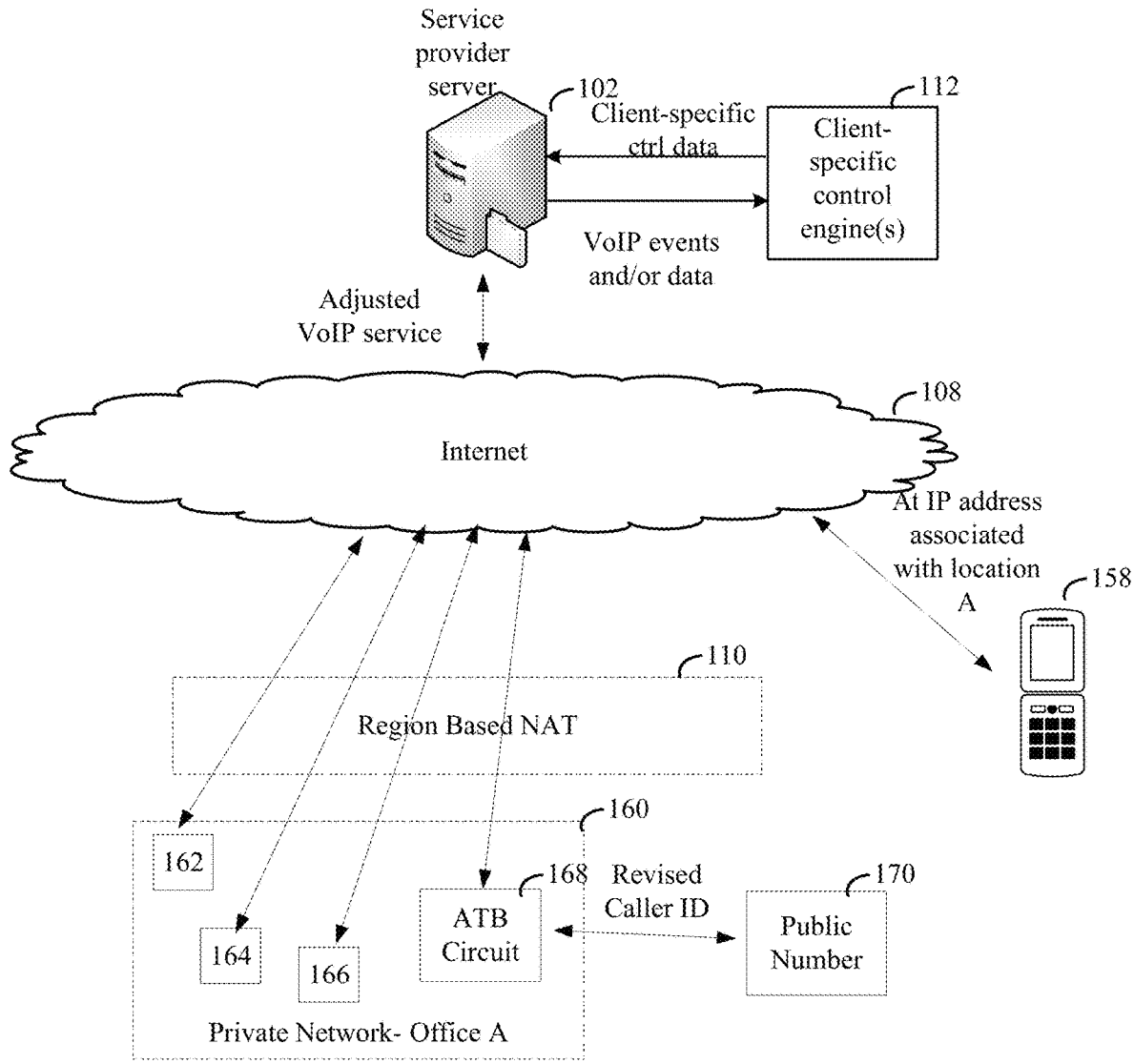

FIG. 1B shows a communication network 101, configured in accordance with one or more embodiments. The communication network 101, as illustrated by FIG. 1B, can include the same or different network as illustrated by FIG. 1A in various embodiments. For example, FIG. 1B can include an illustration of one geographic region of the system of FIG. 1A. As illustrated by FIG. 1B, the private network 160 includes an ATB circuit 168 that is connected to a local line. However, embodiments can include systems having a plurality of geographic regions, each geographic region including an ATB circuit connected to a local line.

A particular entity associated with Office A of the private network 160 can establish a set of rules for revising the caller IDs for calls being made. The set of rules can be part of the client-specific set of data and can correspond to different hierarchy levels of the entity, such as entity wide rules, geographic region rules, office rules, and endpoint specific rules. The endpoints 158, 162, 164, 166 can be distributed and/or otherwise correspond with a particular geographic region (e.g., are distributed across Office A). The endpoints 158, 162, 164, 166 can have an identifier which identifies the respective endpoint, its corresponding geographic region, and an associated extension (e.g., how to reach the endpoint). The extension can correspond with a local number that is provided as a caller ID when the endpoint makes a call to another endpoint in a public network or part of another private network. For example, the endpoint 158 has an extension of 441234, with the "44" indicating the geographic region of Office A and the identifier "1234" identifying a particular endpoint. When the particular endpoint 158 makes a call, a caller ID that is local to the geographic region of which Office A is located is provided (e.g., 650-123-1234).

In various instances, the client entity may control revision of the caller IDs so that a call appears to be made from a location which the endpoint is not located and/or so that the call appears to be from a physical location that the endpoint is located. For example, the particular endpoint 158 is mobile and can travel to different locations. When the endpoint 158 is physically located at a different location than Office A, the caller ID can be revised to a local number of the physical location. As an example, a user is travelling for work and located at Office B in a different geographic location. If the user calls emergency service (e.g., 911 or 8_911), the telecommunications-providing server 102 revises the caller ID to a local number of the different geographic location, as further described and illustrated by FIGS. 2A-2B. Further, in some instances, when the user calls an endpoint of the private network or the public network (for purposes other than emergency services), the caller ID may be revised. For example, other endpoints calling from Office B (or other locations) may be provided a revised caller ID when called by the user using endpoint 158 to indicate that the user is not at their home office and/or to indicate where the user presently is located. Although embodiments are not so limited and client entities may revise caller IDs for a variety of purposes and in a variety of manners by communicating using the interface protocol.

The telecommunications-providing server 102 can identify whether the caller ID should be revised by comparing a geographic region of an identifier corresponding to the requesting endpoint to the determined geographic region where the called endpoint is located (e.g., identified by an IP address) and/or a current physical location of the requesting endpoint. For example, the caller ID assigned to the requesting endpoint is identified and replaced with the revised caller ID using a client-specific set of data of the client entity that is associated with the requesting endpoint. The caller ID is revised in response to the geographic region associated with the identifier being different than the determined geographic region where the endpoint is located and/or the current physical location of the requesting endpoint. In some embodiments, the ATB circuit 168 is activated for connecting over the local line. In other embodiments, the telecommunications-providing server accesses and passes a provisioned VoIP number for connecting (e.g., bridging or routing) the call and using the revised caller ID. If the geographic region associated with the identifier are the same and/or within a threshold distance, as established by a client-specific set of data, from the determined geographic region where the endpoint is located and/or the current location of the requesting endpoint, the caller ID is not revised.

In specific embodiments, the telecommunication-providing server 102 uses a variable extension protocol to interpret whether the data packet received at the first port either corresponds to an extension that identifies the endpoint in a private network or corresponds to information for connecting over the local line through the ATB circuit 168. For example, the telecommunications-providing server 102 uses a variable extension protocol to interpret and identify a first branch office (e.g., Office A) of the requesting endpoint (identified by an identifier in the data packet) and a second branch where the requesting endpoint is currently physically located (e.g., Office B) and using another IP address in the data packet (e.g., a known public IP address which maps to other known endpoints in the geographic region and/or is registered by the client-entity). For example, the telecommunications-providing server 102 uses a variable extension protocol to interpret and identify a first branch office (e.g., Office A) where the requesting endpoint identified by an identifier in the data packet is located and a geographic location of the called number.

As previously discussed in connection with FIG. 1A, the ATB circuit 168 is used to communicate between the private network 160 and an endpoint (e.g., public number 170) of a public network. For example, the ATB circuit 168 connects a VoIP call from the private network 160 to the public network via the local line. The local line can be used to connect to a local service provider. The local service provider can be associated with a public (telephone) number 170 that is connected by the ATB circuit 168 via the local line. Example local service providers can include venders, customers, and/or other service providers with a local or toll-free number and/or emergency service providers, such as the police, fire department, and/or a local emergency number (e.g., 911). In specific embodiments, the ATB circuit 168 can couple and connect simultaneous calls. For example, the ATB circuit 168 can be coupled to one local line, such as a dedicated land line, or a plurality of a land lines.

The ATB circuit 168 can connect endpoints in the private network 160 to the public network by redirecting a VoIP call to the public network 108. The private network 160 can include a plurality of endpoints 162, 164, and 166 and the public network can include a plurality of endpoints. In specific embodiments, the private network 160 can include a plurality of access points, as described in connection with FIG. 1A, for communicating data between the private network and the public network. Each access point can use at least one IP address of each of the subsets exclusively for NAT of data communicated between the access points, as described above.

A processing circuit connected to the private network and the public network performs the communication by providing an assigned mapping through which the first set of respective IP addresses in the private network 160 are associated with the second set of IP addresses of the public network 108. The processing circuit can be part of and/or include the telecommunications-providing server 102. In specific embodiments, the communications between the private network 160 and public network 108 are enabled for NAT in communications by the endpoints in one or more geographic regions via the mapping. For example, the assigned mapping includes identification of a local line, which is connected to an ATB circuit 168 associated with the respective geographic region. The local line has an identifier among the second set of respective IP addresses.

In various embodiments, the mapping is based on determined geographic regions of the endpoints 162, 164, and 166 in the private network 160. For example, geographic locations of the plurality of endpoints 162, 164, and 166 in the private network 160 can be determined and the endpoints 162, 164, and 166 can be segmented into geographic regions based on the determined geographic locations. A data mapping of each respective geographic region to a subset of the first IP addresses assigned to the endpoints 162, 164, and 166 located within the respective geographic region is stored in a database, such as by the telecommunications-providing server 102.

The system can be used to direct telecommunication calls via data packets received by the telecommunications-providing server 102. The telecommunications-providing server 102 can be part of a VoIP PRI Gateway that uses a variable extension protocol to enable direct routing of calls between endpoints via the private and the public networks. In response to a data packet received at a first port of a telecommunications-providing server 102 and having a first IP address of the first set of IP addresses (e.g., identifying an endpoint in the private network), the data packet is used to determine a geographic region that the endpoint identified by the first IP address is located. Further, the data packet is used to determine whether a local line should be accessed for the requested call.

The data packet received at the first port can include data identifying the other endpoint (e.g., the receiving endpoint) that the endpoint is attempting to call. For example, the data packet can include an extension that identifies the other endpoint or corresponds to information for connecting over the local line through the ATB circuit 168. The telecommunications-providing server 102 can use a variable extension protocol to interpret whether the subset of the data packet received at the first port either corresponds to an extension identifying another endpoint in the private network or in the public network. Specifically, the variable extension protocol can be used to interpret whether the subset of the data packet received at the first port either corresponds to an extension identifying another endpoint or corresponds to information for connecting over the local line. Alternatively and/or in addition, the variable extension protocol can be used to interpret and identify which of a plurality of different extensions in a branch office (e.g., a geographic region) is targeted by the data packet at the first port. For example, the telecommunications-providing server 102 can use the variable extension protocol to interpret whether the subset of the data pack either corresponds to the extension that identifies the other endpoint or corresponds to information for connecting over the local line through the ATB circuit 168 and is used to further interpret and identify which of a plurality of different extensions in the branch office is targeted by the data packet received at the first port.

In response to the endpoint identified by the first IP address indicating that the local line should be accessed, the ATB circuit 168 is activated. The indication that the local line should be accessed can include the call number for the VoIP call including an emergency service provider number (e.g., 911) and/or a digit indicating a local telephone number or toll free-number (e.g., an "8" before the telephone number of seven digits, ten digits, or eleven digits, such as 8-123-1234, 8-123-123-1234, and 8-1-800-123-1234). As described above, the ATB circuit 168 can thereby redirect and connect to an emergency line which is specific to the geographic region and assigned for emergency calls of certain type and that are initiated on behalf of the private network.

The ATB circuit 168 can be activated by the control data. For example, the telecommunications-providing server 102 and/or the region-based NAT 110 can send the control data to the ATB circuit 168 using the identifier among the second set of respective IP addresses. The control data can be provided to directly or indirectly control the ATB activation. Examples of indirect control include sending the first IP address, the source address, and a NAT'd data packet. In various specific embodiments, the region-based NAT is used to replace the first IP address in a source address of the received data packet with the second IP address to produce a NAT'd data packet. The NAT'd data packet is used for information (such as the control data or a portion thereof), for connecting over the local line through the ATB circuit 168. The ATB circuit 168 responds to the control data by connecting to the local line, such as a local dedicated line and/or a PRI. In response to the activation, the call associated with the data packet received at the first port (of the telecommunications-providing server 102) is redirected to the public network by obtaining a dial tone and passing at least a subset of the data packet through the ATB circuit 168 for connecting over the local line.

In response to the endpoint identified by the first IP address indicating a second IP address of the first set of IP addresses (e.g., identifying another endpoint in the private network 160), another identifier among the second set of respective IP addresses is used to cause a call associated with the data packet received at the first port of the telecommunications-providing server 102 to be connected (e.g., bridged or routed) for communications between the endpoint identified by the first IP address and an endpoint associated with the second IP address of the first set of IP addresses.

In various embodiments, an endpoint that is part of the local branch can utilize the ATB circuit 168 from a variety of geographic locations to connect to an endpoint that is part of a public network. For example, one or more endpoints of the private network 160 can include a cellphone and/or other mobile devices that can be utilized to make telephone calls. Regardless of the location that the endpoint is at, the user can connect to another endpoint within the public network via the ATB circuit 168, as previously discussed.

The caller ID provided for the call through the ATB circuit 168 can include the identifier (e.g., extension) assigned to the requesting endpoint and/or can be a revised caller ID, in various embodiments. The client entity can control when and how the caller IDs are revised via client-control sets of data. For example, the system includes a processing circuit(s) configured to implement client-specific control engines 112. The client-specific control engines 112 are configured to adjust the remote services (e.g., VoIP communications) provided for each client account according to a respective set of control directives. For instance, the client-specific control engines 112 may dynamically adjust settings for the remote services provided for a client (such as by a PaaS computing server) according to the one or more sets of control directives specified for the client account.

As described with reference to FIG. 1A, the control directives for a client account may generate the client-specific sets of control data based on various data metrics including for example, VoIP call events or data received from the VoIP communication server, data acquired from a client (e.g., from a client database), and/or data provided by third parties (e.g., third party monitoring services). In some embodiments, the control directives may cause the client-specific control engine 112 to query data from a client database or from a service provider database. In some embodiments, the control directives may cause the client-specific control engine 112 to issue an analytics request specifying a particular evaluation of data in a database. For example, client-specific control data communicated to a PaaS computing server may prompt the PaaS computing server to perform a particular analytical evaluation of data stored in the service provider database. After completing the requested evaluation, the PaaS computing server communicates the result back to the requesting client-specific control engine. Data retrieved from the databases and/or via analytics evaluation may be used, for example, to dynamically adjust the provided remote services during operation.

In various specific embodiments, the client-specific control data includes a set of rules regarding revising caller IDs for endpoints of the client, as previously described. The client-specific control engines 112 communicate the client-specific control data to the telecommunications-providing server(s) 102 using an interface protocol having an instruction format that is independent of an instruction format used to implement the client-specific control engines 112 and/or client-specific control directives.

As previously described, the independent instruction format of the interface protocol allows clients to write control directives, for example, using their preferred high-level programming and/or may be used to limit customer access and/or control over the PaaS computing server. For example, the interface protocol may be configured to allow the client-specific control engines to request analytical analysis of data in the service provider database without allowing direct access to the raw data stored therein. Similarly, the client-specific control engines may be configured to request analytical analysis of data in the client database, without allowing direct access to the raw data stored therein.

As described with reference to FIG. 1A, client-specific control engines 112 may be implemented in various locations. For example, client-specific control engines 112 for a particular client account may be implemented in the PaaS computing server(s), in a separate processing circuit communicatively connected to the PaaS computing server(s), using one or more processing circuits of the client, or a combination thereof.

The PaaS computing server and client-specific control engines 112 may be implemented using various circuit arrangements. In an example implementation, a PaaS computing server is configured to provide a VoIP IPBX service for a client. The example computing server can include one or more IPBX server(s) configured to establish and direct VoIP calls for a plurality of endpoints of a customer account. An interface circuit is configured to allow different client-specific control engines to communicate with the PaaS computing server via a common high-level language instruction set (e.g., a set of XML instructions).

In an example implementation of a client-specific control engine 112, the client-specific control engine includes a storage circuit configured to store control directives and/or data for one or more client accounts. A directive execution circuit is configured to provide client-specific control of the remote services provided for a client entity via execution of the control directives for the client stored in the storage circuit. In some implementations, the directive execution circuit is configured to communicate client-specific control data to the PaaS computing server, for example, via interface, using a high-level language instruction set (e.g., a set of extensible meta-data language (XML) instructions). Additionally or alternatively, the directive execution circuit may retrieve one or more sets of directives from an external source (e.g., a client database). In this example, the client-specific control engine can include a directive update interface circuit configured to facilitate upload and/or editing of control directives for a client account.

Figure 2A:
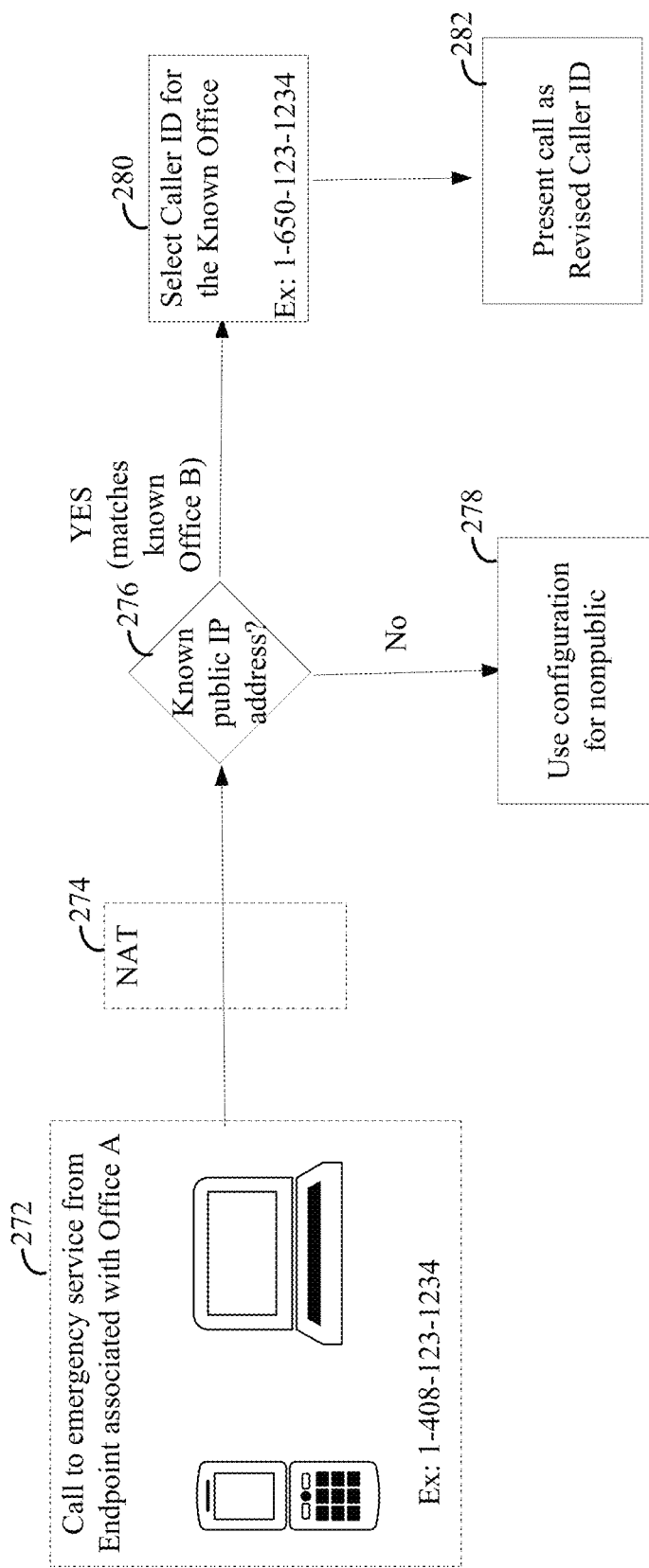
FIGS. 2A-2B show examples of a process for performing region-based bridging of a VoIP call using a revised caller identifier in accordance with one or more embodiments.
Figure 2B:
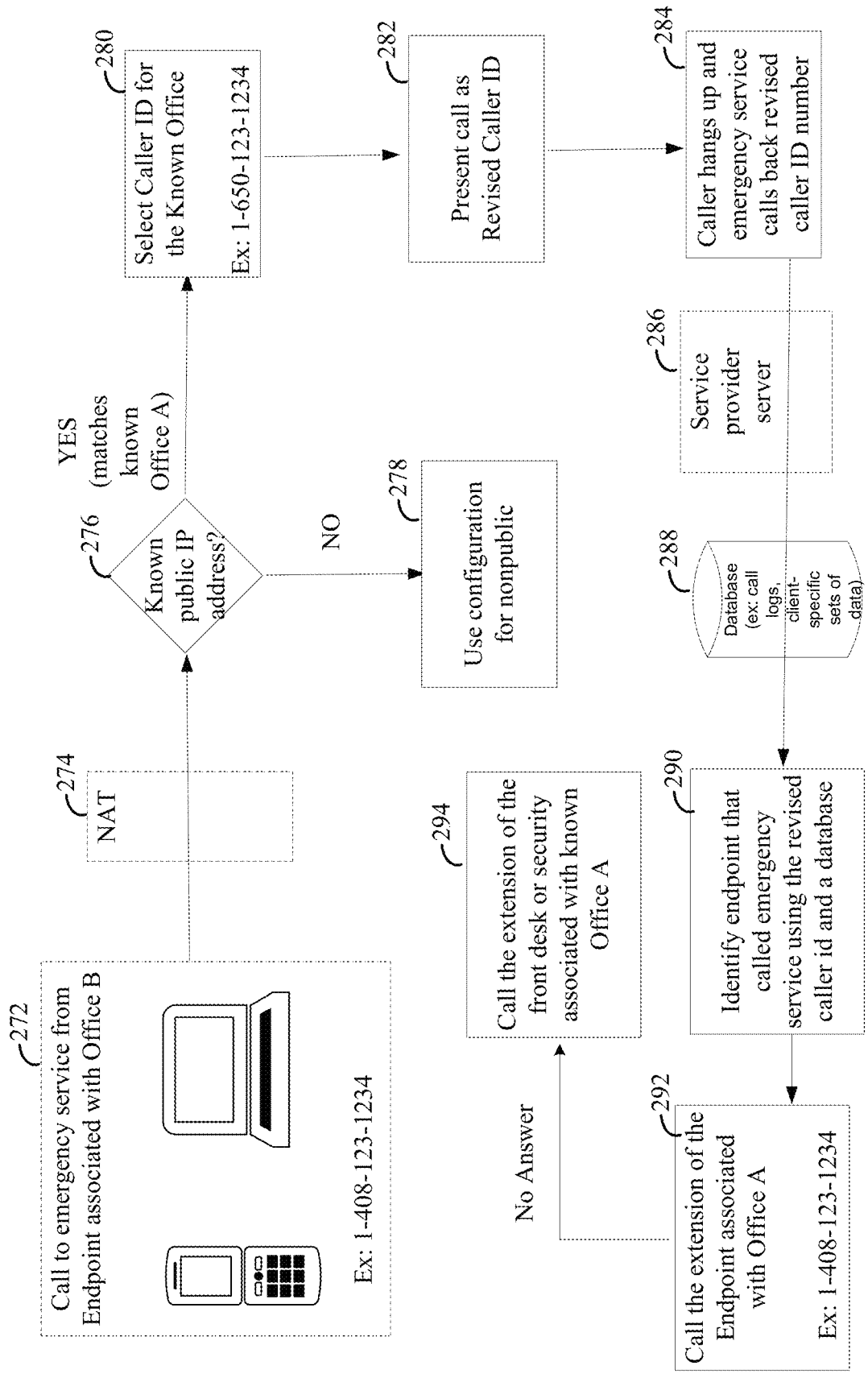

FIGS. 2A-2B show examples of a process for performing region-based bridging of a VoIP call using a revised caller ID in accordance with one or more embodiments. As illustrated by FIG. 2A, at 272, a particular endpoint that corresponds with Office A, travels to another branch of the company (e.g., Office B). The endpoint has an extension that corresponds to Office A, such as 1-408-123-123. While located at Office B, the user has an emergency and calls an emergency service provider using the endpoint. The emergency call is NAT'd to the public IP address of other known endpoints with a known location of Office B, at 274. The telecommunications-providing server can determine a geographic location, where the endpoint is physically located, by comparing the public IP address to known IP addresses of other endpoints of the client entity using NAT, at 276. Although embodiments are not so limited, and the comparison can be to an assigned mapping that does not include NAT, such as other data provided by the client entity, and/or assigned mappings of other client entities. If there is no match, at 278, a configuration is used for non-public or unknown locations. For example, the call is placed using an unrevised caller ID. In response to a match, at 280, based on information of the determined geographic region, e.g., Office B, the caller ID is revised to a local number associated with the geographic region. Using the above-provided example, the caller ID can be revised to a local number that corresponds to Office B when placing the call to the emergency service. At 282, the call is placed to the emergency service provider using the revised caller ID. Thereby, the emergency service provider may know the location of the caller even if the caller cannot talk.

In various embodiments, as previously described, the telecommunications-providing server activates the ATB circuit for bridging the call to the emergency service provider. The ATB circuit couples and connects to the local line and bridges communications, using the revised caller ID, between the requesting endpoint in a private network and the endpoint that is associated with an emergency service provider, and which is specific to the determined geographic region identified by the data packet and assigned for emergency calls of a certain type that are initiated on behalf of the private network.

As a specific example, Mr. Brown travels to Office B with his mobile phone having the phone number 1-408-123-1234 that corresponds with Office A. An emergency occurs and Mr. Brown calls 911 (or any emergency number). The telecommunications-providing server identifies that Mr. Brown is NAT'd behind the same public IP address as known endpoints distributed in Office B. Using this information, the telecommunications-providing server selects a pre-registered local number corresponding to Office B. The pre-registered (e.g., provisioned and set aside) local number is associated with a physical address of Office B. The call is routed to the police with the revised caller ID (changing the caller-id dynamically to 1-650-123-1234 corresponding with the physical address of Office B), so that the police know where Mr. Brown is.

Alternatively and/or in addition, the data packet may indicate that the requesting endpoint is physically located in a geographic region in which existing local numbers (e.g., using a local line) may not be used to connect to an emergency service provider. For example, in some geographic regions, such as France or other countries, the telecommunication service provider may be unable to issue emergency services on existing numbers in the area. The telecommunications-providing server can access and pass a provisioned VoIP number for connecting to the endpoint identified, such as the emergency service provider. The provisioned VoIP number can include a local number of the geographic region where the requesting endpoint is physically located and that is registered with the emergency service provider. In specific embodiments, the telecommunications-providing server can set aside a plurality of provisioned VoIP numbers that are set aside for the different geographic regions corresponding to the respective client entity and are registered with the respective local emergency service providers of the different geographic regions. As previously described, various embodiments include use of the ATB circuit to connect a VoIP call with a revised caller ID, and accessing and passing a provisioned VoIP number for connecting an additional VoIP call with another revised caller ID, which can be performed for the same client-entity or different client-entities.

FIG. 2B illustrates an example process for performing region-based bridging of a call back to the revised caller ID from the called number, in accordance with one or more embodiments. A user may place a call to an emergency service provider, with a revised caller ID, and may subsequently hang up or the call may otherwise be disconnected prior to completing the call, at 284. The emergency service provider may call back the number, via the revised caller ID. The call is received by the telecommunications-providing server, at 286. In response to the callback to the revised caller ID, the telecommunications-providing server identifies the requesting endpoint that (last) requested the VoIP call to the emergency service using the client-specific sets of data stored in a database, at 288. For example, using the database, the last endpoint to call the emergency service (e.g., 911) from the revised caller ID is identified, along with the geographic region in which the last endpoint is physically located, at 290. The extension which is assigned to the endpoint is also identified and used to redirect (e.g., route) the callback to the (last) requesting endpoint, at 292. Further, the call from the endpoint is redirected to an extension of the requesting endpoint, wherein the extension corresponds to a different geographic region than indicated in the revised caller ID (e.g., the extension assigned to the requesting endpoint).

In response to no answer at the redirected call to the requesting endpoint, the call is redirected to an extension of the determined geographic region identified by the data packet using the client-specific sets of data (e.g., where the requesting endpoint is physically located), at 294. For example, the call can be redirected to an extension corresponding to a front desk or security service of a respective client entity corresponding to the requesting endpoint and the determined geographic region. The telecommunications-providing server can identify the extension by accessing a database including the client-specific sets of data and identifying the extension associated with the revised caller ID using a respective client-specific set of data corresponding to the client entity that the requesting endpoint is associated with.

Using the above-provided example of Mr. Brown, after calling the police, Mr. Brown accidently hangs up the phone. The police call back the number provided via the revised caller ID of 1-650-123-1234. Upon receiving the call request, the database of the telecommunication service provider is used to identify that Mr. Brown was the last person to call 911 from the number of 1-650-123-1234 from Office B (and which includes the provisioned VoIP number in some aspects). The call is routed back to the (assigned) extension of Mr. Brown, which is 1-408-123-1234. If Mr. Brown does not answer the call, the call is routed to an extension of Office B, which is established via the client-specific sets of data and can include a front desk or security service.

Figure 3A:
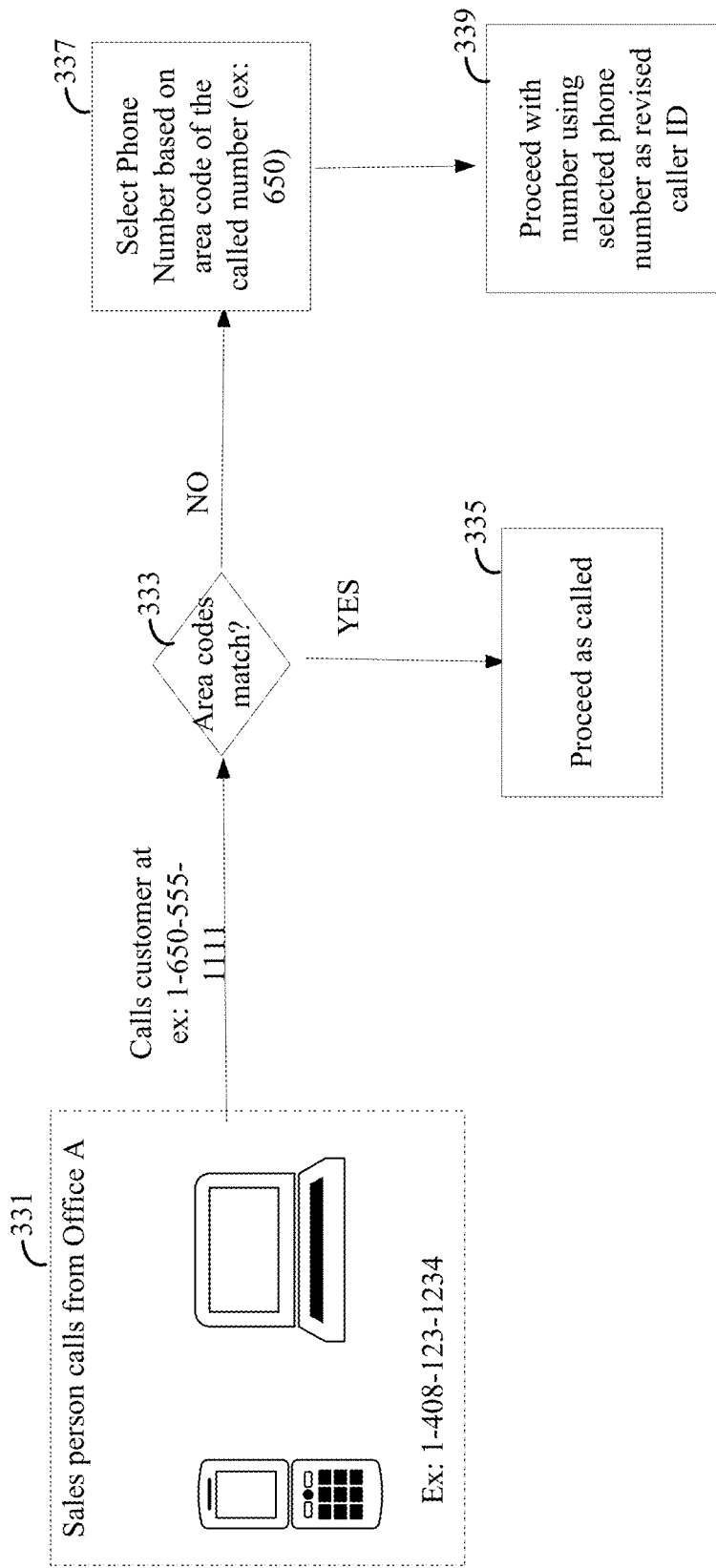
FIGS. 3A-3C show other examples of a process for performing region-based bridging of a VoIP call using a revised caller identifier in accordance with one or more embodiments.
Figure 3B:
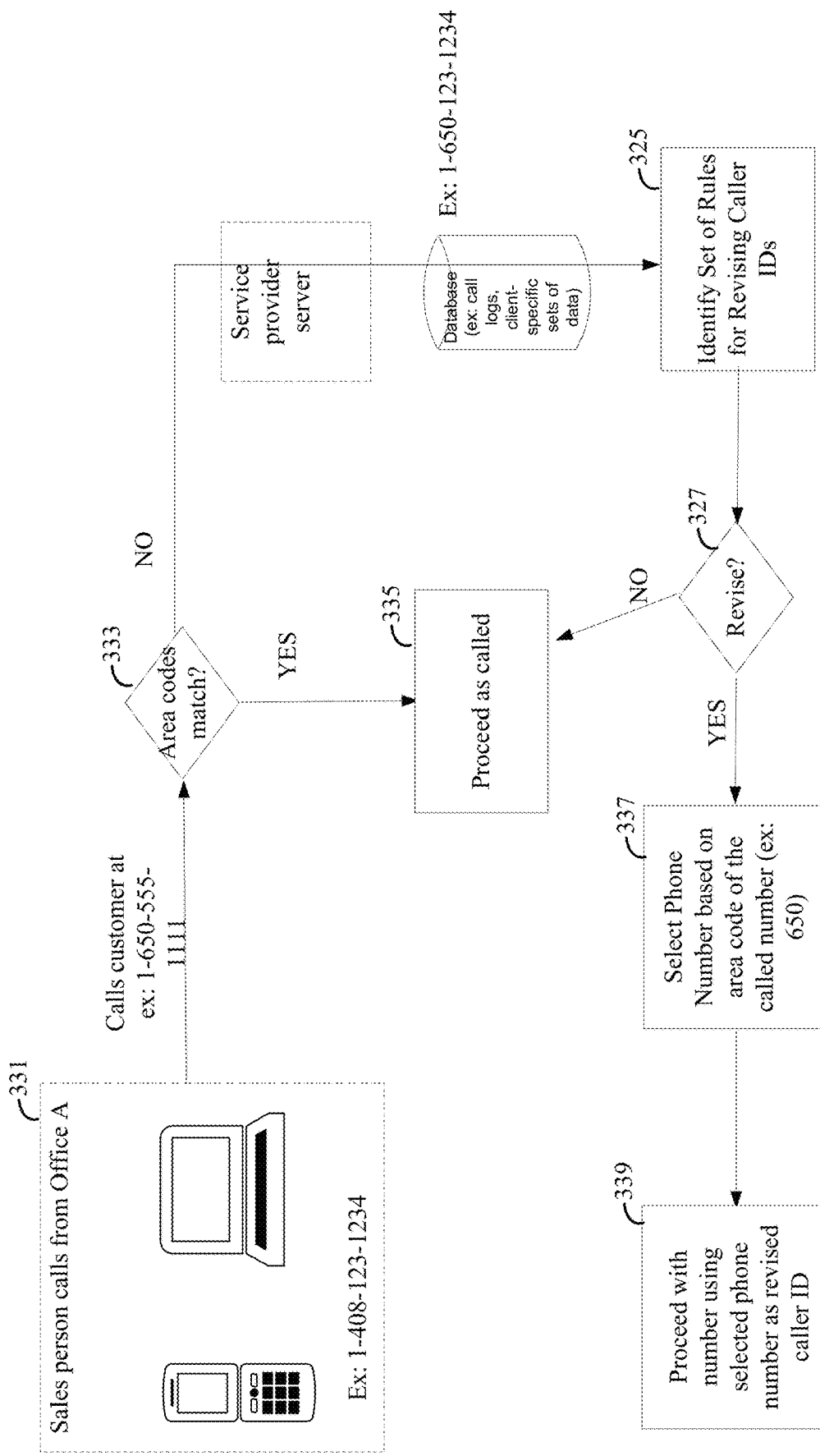
Figure 3C:
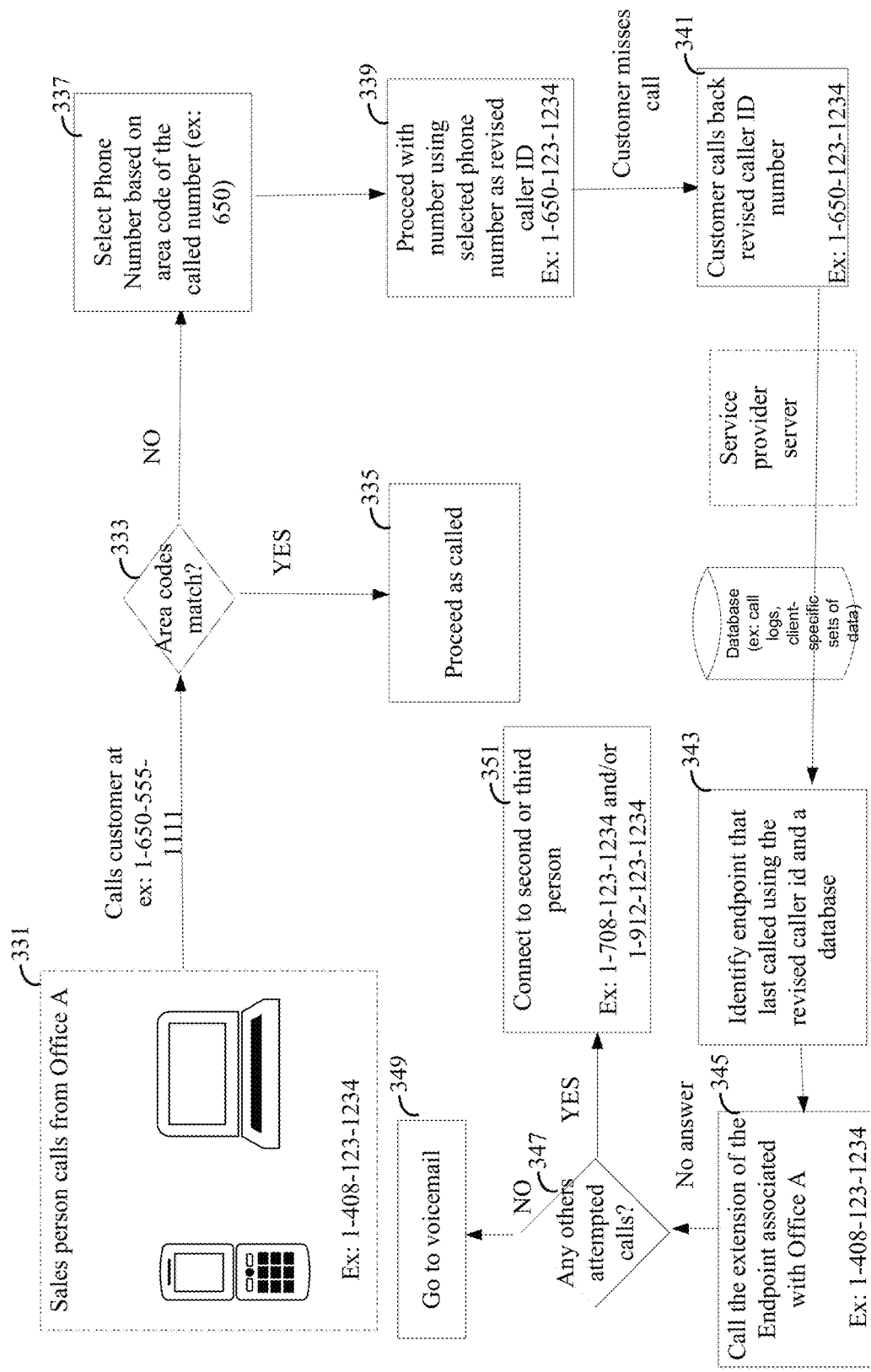

FIGS. 3A-3C show other examples of a process for performing region-based bridging of a VoIP call using a revised caller identifier in accordance with one or more embodiments. For various commercial or business aspects, a caller ID can be revised to appear as though the call is from the same (or local) area code as the called telephone number. A local area call can be shown regardless of the physical location of the endpoint and/or caller, and can be dynamically set up by the entity using a set of rules that can be hierarchy based. Thereby, the entity does not have to provision each individual local number and/or per call. A set of local numbers in different geographic regions can be provisioned for a client entity at the company level. People who are on the part of particular groups (e.g., sales groups) can have their outbound calls caller ID dynamically adjusted and selected from the pool of the local numbers for the company based on the called number/area for the most relevant/closest area.

As illustrated by FIG. 3A, at 331, a particular endpoint that corresponds with Office A, places a call to a customer at a different geographic region than Office A is located. The endpoint has an extension that corresponds to Office A, such as 1-408-123-1234 and the called number corresponds to the different geographic region, such as 1-650-555-1111. At 333, a determination of whether the area code of the called number matches and/or is within a threshold distance from the area code of the extension is made by the telecommunications-providing server. In response to the area codes matching and/or indicating that the endpoints are within the threshold distance, at 335, the call is placed using the caller ID assigned to the requesting endpoint (e.g., using 1-408-123-1234). In response to the area codes not matching and/or indicating that the endpoints are outside the threshold distance from one another, at 337, a local number is selected based on the area code of the called number (e.g., 650). The number selected can be from a set of provisioned local numbers (e.g., 1-650-123-1234) for the geographic region being called. At 339, the call proceeds using the selected local phone number as the revised caller ID.

The telecommunications-providing server, in specific embodiments, activates the ATB circuit for bridging the call to the endpoint in the public network using the revised caller ID. The ATB circuit couples and connects to the local line and bridges communications, using the revised caller ID. In other embodiments, the called number is associated with an endpoint of the private network (e.g., another client entity of the telecommunication-service provider and/or another endpoint associated with the same client entity). The telecommunications-providing server, as previously discussed, can set aside a set of provisioned VoIP numbers and/or local numbers for different geographic regions, and pass one of the provisioned VoIP numbers set aside for the determined geographic region through the ATB circuit for connecting to the endpoint in the public network, and/or through the telecommunications-providing server for bridging the call to another endpoint of the private network.

In various embodiments, the telecommunications-providing server selectively revises caller IDs for the identified endpoints of the client entity based on the set of rules. For example, not all called IDs may be changed. A client entity may set up and/or control the revision to caller IDs so a subset of endpoints do have revised caller IDs and the remaining do not have revised caller IDs. The client entity can also identify extensions and/or other forwarding rules for callbacks with no answer.

FIG. 3B illustrates an example process for selectively performing region-based bridging and revising caller IDs, in accordance with one or more embodiments. The steps can include the same steps as illustrated and described in FIG. 3A. As illustrated, in response to determining the area codes do not match (or prior to), the telecommunications-providing server, at 325, identifies a set of rules for revising caller IDs for the client entity. The telecommunications-providing server selectively revises caller IDs for the identified endpoints of the respective client entity based on the set of rules. For example, based on the identifier of the requesting endpoint, the telecommunications-providing server identifies the respective client entity and corresponding client-specific set of data. The telecommunications-providing server compares the data packet to the set of rules to determine if the caller ID should be revised, at 327. In response to determining the caller ID should not be revised, at 335, the call proceeds normally. In response to determining the caller ID should be revised, at 337, a phone number is selected and the call proceeds, at 339, using the selected phone number as the revised caller ID.

FIG. 3C illustrates an example process for performing region-based bridging of a callback to the revised caller ID from the called number, in accordance with one or more embodiments. A user may place a call to a customer (or other endpoint), with a revised caller ID, and may not reach the customer and/or for other reasons the customer calls back, at 341. The customer may callback the number, via the revised caller ID. The call is received by the telecommunications-providing server. In response to the callback to the revised caller ID, the telecommunications-providing server identifies the requesting endpoint that (last) requested the VoIP call to the customer using the revised caller ID using the client-specific sets of data stored in a database, at 343. For example, using the database, the last endpoint to call the customer (e.g., 1-650-555-1111) from the revised caller ID is identified (and which can include a provisioned VoIP number in some aspects). The extension which is assigned to the endpoint is also identified and used to redirect (e.g., route) the call back to the requesting endpoint using the identified extension, at 345.

In response to no answer at the redirected call to the extension, at 347, the telecommunications-providing server identifies if one or more different endpoints in the private network called the customer (e.g., the called endpoint) using the database. In response to no other calls from different endpoints in the private network to the customer number and/or no calls within a threshold period of time, at 349, the call is redirected to a voicemail corresponding with the requesting endpoint. In response to a call from a different endpoint in the private network and/or within the threshold period of time, at 351, the call is redirected to an extension of the different endpoint in the private network.

As a specific example, Mr. Brown is located at Office A and has an extension of 1-408-123-1234. Mr. Brown calls a customer at a phone number of 1-650-555-111. In response to the area codes of the extension and the customer phone number not matching, a phone number is selected based on the area code of the customer number (e.g., 650). The call proceeds with the selected number as the revised caller ID, which is provided to the customer (e.g., 1-650-123-1234). The customer does not answer and later calls back the revised caller ID of 1-650-123-1234. Upon receiving the call request, the database of the telecommunication service provider is used to identify that Mr. Brown was the last person to call the customer from the number of 1-650-123-1234 from Office A. The call is routed back to the extension of Mr. Brown, which is 1-408-123-1234. If Mr. Brown does not answer the call, the telecommunications-providing server determines if another endpoint called the customer and/or called within a threshold amount of time. If not, the call is routed to the voicemail of Mr. Brown. If so, the call is rerouted to an extension of the other endpoint (e.g., 1-708-123-1234).

Figure 4:
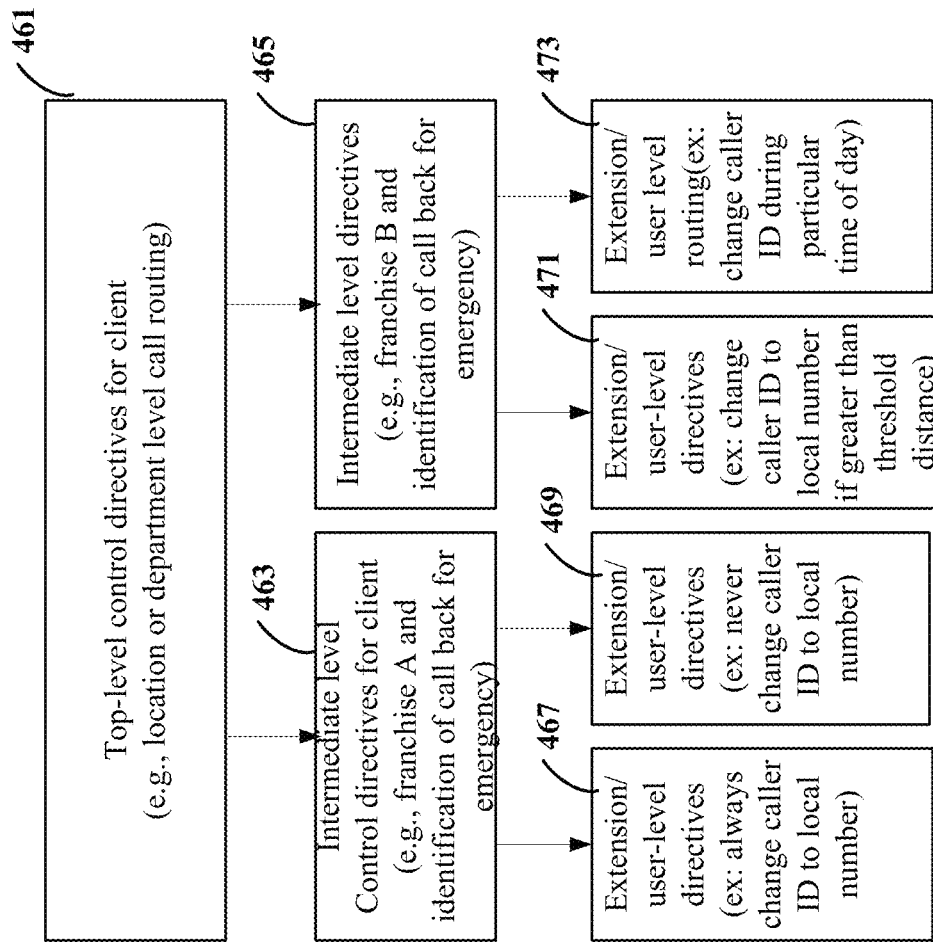
FIG. 4 is a block diagram showing an example hierarchy of control directives for client-specific control by an example client, in accordance with one or more embodiments of the present disclosure.

FIG. 4 is a block diagram showing an example hierarchy of control directives for client-specific control by an example client entity, in accordance with one or more embodiments of the present disclosure. The revision for caller IDs, as previously described, can be based on a set of rules established by the respective client entity. The set of rules can be part of the client-specific set of data and can correspond to different hierarchy levels of the entity, such as entity wide rules, geographic region rules, office rules, and endpoint specific rules. Example rules include revising all caller IDs of an office, revising all caller IDs of endpoints associated with sales people, revising caller IDs at particular times and/or in response to the called number being greater than a threshold distance from the actual caller ID, the called number indicating an emergency service is being called and the user is physically located at a different location than their caller ID would otherwise indicate, a set of provisioned VoIP numbers for different geographic regions, among many other sets of rules. The client entity can dynamically update the set of rules based on demands and needs.

As illustrated by FIG. 4, the set of rules for a particular client entity can be across the entire entity (e.g., high level), specific to particular geographic regions (e.g., intermediate level), and/or specific to particular endpoints (e.g., low level). Example rules include revising all caller IDs of an office, revising all caller IDs of endpoints associated with sales people, revising caller IDs at particular times and/or in response to the called number being greater than a threshold distance from the actual caller ID, the called number indicating an emergency service is being called and the user is physically located at a different location than their caller ID would otherwise indicate, among many other sets of rules. The client entity can dynamically update the set of rules based on demands and needs.

In this example, block 461 provides a set of top-level control directives that are applicable to all VoIP calls for a client entity. Blocks 463 and 465 show a set of intermediate-level control directives that are applicable only to a subset of endpoints included in the client account (e.g., for respective IPBXs, branches, departments, and/or franchisees). Blocks 467, 469, 471, and 473 are shown as lower-level control directives that are applicable to particular extensions and/or end-users of the client account. The lower-level control directives may be useful, for example, for an end-user to customize and/or dynamically adjust direction of calls to an extension and/or revision of caller IDs throughout the day.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, a VoIP endpoint (or endpoint) is a communication circuit that can include processing circuits which are configured to establish VoIP communication sessions with other devices (e.g., personal computers, IP-enabled mobile phones, and tablet computers). In certain embodiments, such a processing circuit is one or more computer circuits programmed to execute a set (or sets) of instructions (and/or configuration data). The instructions (and/or configuration data) can be in the form of firmware or software stored in and accessible from a memory (circuit), where such circuits are directly associated with one or more algorithms (or processes). The activities pertaining to such algorithms are not limited to the specific flows shown in the flow charts illustrated in the figures (e.g., where a circuit is programmed to perform the related steps, functions, operations, activities, etc.). The flow charts are merely specific detailed examples. The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Various embodiments are implemented in accordance with the following U.S. Applications. U.S. Patent Application Ser. No. 62/353,971 filed on Jun. 23, 2016, entitled "Client-Specific Control of Shared Telecommunications Services", U.S. patent application Ser. No. 15/240,391 filed Aug. 18, 2016, entitled "Client-Specific Control of Shared Telecommunications Services", U.S. Patent Application Ser. No. 62/353,977 filed Jun. 23, 2016, entitled "Client-Specific Control of Shared Telecommunications Services", and U.S. patent application Ser. No. 15/240,457 filed on Aug. 18, 2016, entitled "Client-Specific Control of Shared Telecommunications Services", which are all fully incorporated by reference herein for their general teaching directed to client control of telecommunications services, and their more specific teaching direct to an interface implementation and involving communication on both sides of the interface. U.S. patent application Ser. No. 15/337,545 filed on Oct. 28, 2016 (U.S. Pat. No. 10,027,624), and entitled "Region-Based Redirection and Bridging of Calls", which is fully incorporated by reference for its general teaching directed to redirecting and bridging calls, and its specific teaching directed to using analog-telephone bridging circuits to access local lines. The aspects discussed therein may be implemented in connection with one or more of embodiments and implementations of the present disclosure (as well as with those shown in the figures). In view of the description herein, those skilled in the art will recognize that many changes may be made thereto without departing from the spirit and scope of the present disclosure.

Certain embodiments are directed to a computer program product (e.g., nonvolatile memory device), which includes a machine or computer-readable medium having stored instructions which may be executed by a computer (or other electronic device) to perform these operations/activities. For example, these instructions reflect activities or data flows as may be exemplified in the flow chart. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus, comprising:
a data communications server configured and arranged to provide data communications service relationships with a plurality of disparate client entities by controlling communication between endpoint devices respectively associated with each of the plurality of disparate client entities;
a processing circuit configured and arranged to, for each of the plurality of disparate client entities, communicate with the data communications server by generating client-specific sets of data, and by conveying the client-specific sets of data over an interface protocol, wherein the data communications server and each of the plurality of disparate client entities are configured and arranged with the interface protocol to facilitate permissible types of communications; and wherein the data communications server is further configured and arranged to:

respond to a data packet requesting a data communication by determining a geographic region that an endpoint device identified using the data packet is located and whether a local data path should be accessed;

respond to the data packet indicating that a local data path should be accessed by:

revising an identification (ID) for the data communication based on the client-specific sets of data, and based on the determined geographic region; and redirecting the data communication by passing at least a subset of the data packet over the local data path, the subset of the data packet including the revised ID that includes a local identifier based on the determined geographic region.

2. The apparatus of claim 1, wherein another endpoint device, through which the data path is connected, receives a transposed number indicating a data communication is being made from the local identifier using the revised ID.

3. The apparatus of claim 1, wherein the data communications server is configured to:

set aside a plurality of provisioned data communications identifiers that are set aside for different geographic regions, and pass a provisioned data communications identifier, which is among the plurality of provisioned data communications identifiers and which is set aside for the determined geographic region, through the local data path for connecting to the endpoint device being contacted.

4. The apparatus of claim 1, wherein the data communications server is further configured and arranged to identify whether the ID, which corresponds to an endpoint device requesting the data communication, should be revised by:

comparing a geographic region of an identifier corresponding to the requesting endpoint device to a current physical location of the requesting endpoint device;

in response to the geographic region associated with the identifier being different than the current physical location of the requesting endpoint device, revising the ID to include the local identifier based on the determined geographic region; and in response to the geographic region associated with the identifier being within a threshold distance from the current physical location of the requesting endpoint device, using the ID corresponding to the requesting endpoint device for the data communication.

5. The apparatus of claim 1, wherein the data communications server uses a variable extension protocol to interpret whether the data packet received corresponds to an extension that identifies the endpoint device in a private network or corresponds to information for connecting over the local data path and is further configured and arranged to respond to the endpoint device indicating the local data path should be accessed by:

replacing an ID corresponding to an endpoint device requesting the data communication with the revised ID; and activating a bridging circuit for connecting over the local data path.

6. The apparatus of claim 1, wherein the data communications server is further configured and arranged to use a variable extension protocol to interpret and identify a first branch office that an endpoint device requesting the data communication identified by an identifier in the data packet and a second branch that the requesting endpoint device is currently physically located at using another identifier in the data packet.

7. The apparatus of claim 1, the apparatus further including a bridging circuit configured and arranged to couple and connect to the local data path and bridge communications, using the revised ID, between an endpoint device requesting the data communication in a private network and an endpoint device that is associated with an emergency service which is specific to the determined geographic region identified by the data packet and assigned for emergency communications of a certain type that are initiated on behalf of the private network.

8. The apparatus of claim 7, wherein the data communications server is further configured and arranged to respond to a data communication to the revised ID from an endpoint device requesting the data communication by:

identifying the requesting endpoint device that requested the data communication to the endpoint device associated with the emergency service using the client-specific sets of data stored in a database; and redirecting the data communication from the requesting endpoint device to an extension of the requesting endpoint device, wherein the extension corresponds to a different geographic region than indicated in the revised ID.

9. The apparatus of claim 8, wherein the data communications server is further configured and arranged to redirect the data communication from the endpoint device associated with the emergency service to an extension of the determined geographic region identified by the data packet and corresponding to a front desk or security service of a respective disparate client entity of the requesting endpoint device and the geographic region using the client-specific sets of data.

10. The apparatus of claim 8, wherein the data communications server is further configured and arranged to redirect the data communication to the extension by accessing a database including the client-specific sets of data and identifying the extension associated with the revised ID using a respective client-specific set of data corresponding to a respective disparate client entity that the requesting endpoint device is associated with.

11. The apparatus of claim 1, wherein the processing circuit is further configured and arranged to communicate identification of endpoint devices of a respective disparate client entity that the data communications server is to revise the ID based on a set of rules, and wherein the data communications server is further configured and arranged to selectively revise IDs for the identified endpoint devices of the respective client entity based on the set of rules.

12. The apparatus of claim 1, the apparatus further including:

a bridging circuit configured and arranged for coupling and connecting to the local data path and bridging communications between an endpoint device requesting the data communication in a private network and the endpoint device in a public network which is located in the geographic region using the revised ID, and wherein the data communications server is configured to set aside a set of provisioned data communications identifiers that are set aside for different geographic regions, and to pass one of the provisioned data communications identifiers set aside for the determined geographic region through the bridging circuit for connecting to the endpoint device in the public network.

13. The apparatus of claim 12, wherein the data communications server is further configured and arranged to respond to a data communication to the revised ID from an endpoint device requesting the data communication by:
identifying the requesting endpoint device that last requested the data communication using the client-specific sets of data, and
redirecting the data communication from the endpoint device to an extension corresponding to the requesting endpoint device.

14. The apparatus of claim 1, wherein the data communications server is further configured and arranged to identify an ID assigned to an endpoint device requesting the data communication and replace the ID of the requesting endpoint device with the revised ID using a client-specific set of data of one of the disparate client entities associated with the requesting endpoint device.

15. The apparatus of claim 1, wherein for each of the plurality of disparate client entities, the processing circuit generates the client-specific sets of data by executing a set of instructions specified in a respective set of control directives for the client entity.

16. The apparatus of claim 1, wherein for a first one of the plurality of disparate client entities,
the processing circuit generates the client-specific sets of data by executing a set of instructions specified in a respective set of control directives for the client entity, the set of instructions being specified in a first instruction language; and
the client-specific sets of data specify client-specific communications routing commands in a second instruction language that is different from the first instruction language.

17. The apparatus of claim 1, wherein the data communications server is further configured and arranged to:
respond to another data packet received at the data communications server requesting an additional data communication by determining a geographic region that an additional endpoint device identified using the data packet is located and whether a local data path should be accessed;
revise an ID for the additional data communication based on the client-specific sets of data, and based on the determined geographic region; and
connect the additional data communication by accessing and passing a provisioned data communications number, the provisioned data communications number including the revised ID that includes a local number identified by the determined geographic region that the additional endpoint device is located.

18. A method comprising:
providing data communications service relationships with a plurality of disparate client entities by controlling communication between endpoint devices respectively associated with each of the plurality of disparate client entities;
for each of the plurality of disparate client entities, generating client-specific sets of data indicative of client-specific communications routing, and conveying the generated client-specific sets of data over an interface protocol via communication between a data communications server and a processing circuitry of each of the plurality of disparate client entities that are configured and arranged with an interface protocol to facilitate permissible types of communications;
responding to a data packet request for a data communication by determining a geographic region that an endpoint device identified using the data packet is located and whether a local data path should be accessed; and
responding to the data packet indicating that a local data path should be accessed by:
revising an identification (ID) for the data communication based on the client-specific sets of data, and based on the determined geographic region; and
causing control data to be sent to activate a bridging circuit and redirect the data communication by passing at least a subset of the data packet through the bridging circuit for connecting over the local data path, the subset of the data packet including the revised ID that includes a local identifier based on the determined geographic region.

19. The method of claim 18, further including using a variable extension protocol to interpret and identify a first branch office that a requesting endpoint device identified by an identifier in the data packet corresponds to and a second branch that the requesting endpoint device is currently physically located at using another identifier in the data packet.

20. The method of claim 18, further including responding to the data packet indicating that a local line should be accessed by revising the ID for the data communication based on an extension or identifier that corresponds to an endpoint device requesting the data communication.

* * * * *